United States Patent
Edstrom et al.

(10) Patent No.: US 9,203,627 B2
(45) Date of Patent: *Dec. 1, 2015

(54) SYSTEMS AND METHODS FOR FLASH CROWD CONTROL AND BATCHING OCSP REQUESTS VIA ONLINE CERTIFICATE STATUS PROTOCOL

(71) Applicant: Citrix Systems, Inc., Fort Lauderdale, Florida, FL (US)

(72) Inventors: Christofer Edstrom, San Jose, CA (US); Tushar Kanekar, Santa Clara, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,867

(22) Filed: Dec. 9, 2013

(65) Prior Publication Data

US 2014/0101441 A1    Apr. 10, 2014

Related U.S. Application Data

(63) Continuation of application No. 12/645,907, filed on Dec. 23, 2009, now Pat. No. 8,627,063.

(51) Int. Cl.
*H04L 9/32* (2006.01)
*H04L 29/06* (2006.01)
*H04L 29/08* (2006.01)

(52) U.S. Cl.
CPC .......... *H04L 9/3268* (2013.01); *H04L 63/0823* (2013.01); *H04L 63/0884* (2013.01); *H04L 67/2833* (2013.01); *H04L 67/2842* (2013.01);

(Continued)

(58) Field of Classification Search
CPC ..................................................... H04L 9/3268
See application file for complete search history.

(56) References Cited

U.S. PATENT DOCUMENTS

| | | |
|---|---|---|
| 5,657,290 A | 8/1997 | Churcher |
| 5,657,390 A | 8/1997 | Elgamal et al. |
| 6,763,459 B1 | 7/2004 | Corella |

(Continued)

OTHER PUBLICATIONS

"Certificate Revocation: Why You Should Do It and Why You Don't", Paco Hope, ;login, vol. 26, No. 8 (Dec. 2001), p. 36.

(Continued)

*Primary Examiner* — Matthew Henning
(74) *Attorney, Agent, or Firm* — Foley & Lardner LLP; Christopher J. McKenna; Paul M. H. Pua

(57) ABSTRACT

The present invention is directed towards systems and methods for batching OCSP requests and caching corresponding responses. An intermediary between a plurality of clients and one or more servers receives a first client certificate during a first SSL handshake with a first client and a second client certificate during a second SSL handshake with a second client. The intermediary may identify that the statuses of the client certificates are not in a cache of the intermediary. An OCSP responder of the intermediary may transmit a single request to an OCSP server to determine the statuses. The intermediary may determine, from a single response received from the OCSP server, whether to establish SSL connections with the clients based on the statuses. The intermediary may store the statuses to the cache for determining whether to establish a SSL connection in response to receiving a client certificate from the first client.

20 Claims, 21 Drawing Sheets

(52) U.S. Cl.
CPC ........... *H04L 63/166* (2013.01); *H04L 67/2852* (2013.01); *H04L 2209/38* (2013.01)

(56) References Cited

U.S. PATENT DOCUMENTS

| | | | |
|---|---|---|---|
| 7,047,404 | B1 | 5/2006 | Doonan et al. |
| 7,120,793 | B2 | 10/2006 | Hope et al. |
| 8,621,204 | B2 | 12/2013 | Edstrom et al. |
| 2002/0029200 | A1 | 3/2002 | Dulin et al. |
| 2002/0051170 | A1* | 5/2002 | Kuwahara et al. ........... 358/1.15 |
| 2002/0156769 | A1* | 10/2002 | Polk ................................. 707/1 |
| 2003/0126433 | A1* | 7/2003 | Hui ............................... 713/158 |
| 2004/0111607 | A1 | 6/2004 | Yellepeddy |
| 2005/0148323 | A1 | 7/2005 | Little et al. |
| 2005/0154879 | A1 | 7/2005 | Engberg et al. |
| 2005/0172128 | A1 | 8/2005 | Little et al. |
| 2005/0182773 | A1* | 8/2005 | Feinsmith ..................... 707/100 |
| 2005/0289084 | A1 | 12/2005 | Thayer et al. |
| 2007/0073621 | A1 | 3/2007 | Dulin et al. |
| 2007/0234047 | A1 | 10/2007 | Miyazawa |
| 2009/0013399 | A1 | 1/2009 | Cottrell et al. |
| 2009/0063855 | A1 | 3/2009 | Parkinson |
| 2010/0146250 | A1 | 6/2010 | Bergerson et al. |

OTHER PUBLICATIONS

US Notice of Allowance for U.S. Appl. No. 12/645,907 dated Aug. 29, 2013.
US Notice of Allowance for U.S. Appl. No. 12/645,664 dated Aug. 29, 2013.
US Office Action for U.S. Appl. No. 12/645,644 dated Apr. 23, 2013.
US Office Action for U.S. Appl. No. 12/645,664 dated Oct. 1, 2012.
US Office Action for U.S. Appl. No. 12/645,907 dated Oct. 2, 2012.
US Office Action for U.S. Appl. No. 12/645,907 dated Apr. 25, 2013.
US Office Action for U.S. Appl. No. 12/645,893 dated Jan. 31, 2013.
US Office Action for U.S. Appl. No. 12/645,893 dated Mar. 1, 2012.
SSL Protocol, Nov. 1994, Retrieved from the Internet; http://www.webstart.com/jed/papers/HRM/references/ssl.html[Apr. 6, 2014 4:19:46 PM](19 pages).
US Office Action for U.S. Appl. No. 12/645,893 dated Apr. 10, 2014.
US Office Action for U.S. Appl. No. 12/645,893 dated Jul. 30, 2014.
US Notice of Allowance on U.S. Appl. No. 14/132,303 DTD Jun. 22, 2015.
US Office Action for U.S. Appl. No. 14/132,303 dated Jan. 15, 2015.
US Office Action on U.S. Appl. No. 12/645,893 DTD May 27, 2015.

* cited by examiner

SYSTEMS AND METHODS FOR FLASH CROWD CONTROL AND BATCHING OCSP REQUESTS VIA ONLINE CERTIFICATE STATUS PROTOCOL

RELATED APPLICATION

The present application claims priority to and is a continuation of U.S. application Ser. No. 12/645,907, entitled "Systems and Methods For Batching and Caching of OCSP Responses" and filed on Dec. 23, 2009, which is incorporated herein by reference in its entirety for all purposes.

FIELD OF THE DISCLOSURE

The present application generally relates to the use of Online Certificate Status Protocol (OCSP) in data communications. In particular, the present application relates to systems and methods for processing one or more OCSP responses in connection with one or more Secure Socket Layer handshaking processes.

BACKGROUND

OCSP may be used in any cryptographic system, such as a public key infrastructure (PKI) system, for accessing the status of digital certificates. For example, the status of a digital certificate may be determined to be valid or to have been revoked. A request to initiate a connection may include transmission of a digital certificate of the initiating device that has to be validated. If the status on the certificate is found to be revoked and/or invalid, the request may be refused. In some embodiments, the request for connection may be a request to establish a SSL connection. A client device and a server may establish an SSL connection via a series of handshaking messages.

BRIEF SUMMARY

The present application is directed towards methods and systems for using Online Certificate Status Protocol (OCSP) in data communications between at least one client device and at least one server. An intermediary device may reside between the at least one client device and at least one server. There may be a need to validate a certificate of a client device in connection with a request to initiate a communications link via the intermediary device. The intermediary device may receive the request and determine the certificate revocation status of the certificate using OCSP. Based at least in part on the status, the intermediary device may establish the requested connection or refuse the request. The present disclosure describes several techniques to more efficiently perform OCSP processing and validation between clients and servers.

In one aspect, the present invention is related to a method of batching OCSP requests and/or caching responses to the OCSP requests. The method includes receiving, by an intermediary device between a plurality of clients and one or more servers, a first client certificate during a first Secure Socket Layer (SSL) handshake with a first client and a second client certificate during a second SSL handshake with a second client. Each of the first client certificate and the second client certificate may correspond to a certificate authority. The intermediary device may identify that a status of the first client certificate and a status of the second client certificate is not in a cache of the intermediary device. An Online Certificate Status Protocol (OCSP) responder of the intermediary device may transmit a single request to an OCSP server to determine the status of each of the first client certificate and the second client certificate. The intermediary device may determine, from a single response received from the OCSP server, whether to establish a first SSL connection with the first client based on the status of the first client certificate and a second SSL connection with the second client based on the status of the second client certificate. The intermediary device may store to the cache a first cache entry identifying the status of the first client certificate and a second cache entry identifying the status of second client certificate. Each of the first cache entry and the second cache entry may be stored in association with the OCSP responder and/or with a cache expiry identified by the OCSP responder. The intermediary device may receive the first client certificate from the first client during a third SSL handshake. The intermediary may determine whether to establish a third SSL connection with the first client based on the status of the first client certificate identified via the cache.

In some embodiments, the intermediary device receives one of the first client certificate or the second client certificate comprising an identifier of the certificate authority. The method may include determining that a cache entry for the status of the first client certificate or the second client certificate has expired. The intermediary device may wait a predetermined time period for receipt of additional client certificates corresponding to the certificate authority before transmitting the single request. In one embodiment, the intermediary device may receive a third client certificate before expiration of the predetermined time period and including in the single request to the OCSP server, a request for the status of the third client certificate.

In various embodiments, the intermediary device may identify the OCSP responder of a plurality of OCSP responders of the intermediary device corresponding to the certificate authority. The intermediary device may establish SSL connections with those clients having client certificates with a good status and not establishing, by the intermediary device, SSL connection with those clients having client certificates not having a good status. The intermediary device may generate a hash for one of the first cache entry or the second cache entry based on one or more of: an issuer name, a subject name and a response. The intermediary device may store one of the first cache entry or the second cache entry from responses to the OCSP responder separate from cache entries of responses to a second OCSP responder. The intermediary device may determine to establish the third SSL connection based on the first cache entry identifying the status of the first client certificate as good and the first cache entry has not expired.

In another aspect, the present invention is related to a system of batching Online Certificate Status Protocol (OCSP) requests and caching responses to the OCSP requests. The system includes an intermediary device receiving a plurality of client certificates during a Secure Socket Layer (SSL) handshake, a first client certificate during a first Secure Socket Layer (SSL) handshake with a first client and a second client certificate during a second SSL handshake with a second client, each of the first client certificate and the second client certificate corresponding to a certificate authority. A cache manager of the intermediary device may identify that a status of the first client certificate and a status of the second client certificate is not in a cache of the intermediary device. An Online Certificate Status Protocol (OCSP) responder of the intermediary device may transmit a single request to an OCSP server to the status of each of the first client certificate and the second client certificate. An SSL engine of the intermediary device may determine, from a single response received from the OCSP server, whether to establish a first SSL connection with the first client based on the status of the first client certificate and a second SSL connection with the second client based on the status of the second client certificate. The cache manager may store to the cache a first cache entry identifying the status of the first client certificate and a second cache entry identifying the status of second client certificate. Each of the first cache entry and the second cache entry stored in association with the OCSP responder and with a cache expiry identified by the OCSP responder. The intermediary device receives from first client during a third SSL handshake, the first client certificate and the SSL engine determines whether to establish a third SSL connection with the first client based on the status of the first client certificate identified via the cache.

In some embodiments, the intermediary device receives one of the first client certificate or the second client certificate comprising an identifier of the certificate authority. In certain embodiments, the intermediary device may wait a predetermined time period for receipt of additional client certificates corresponding to the certificate authority before transmitting the single request. The intermediary device may receive a third client certificate before expiration of the predetermined time period. The OCSP responder may include in the single request to the OCSP server a request for the status of the third client certificate. In one embodiment, the intermediary device identifies the OCSP responder from a plurality of OCSP responders of the intermediary device corresponding to the certificate authority. In certain embodiments, the SSL engine establishes SSL connections with those clients having client certificates with a good status. The SSL engine may not establish SSL connection with those clients having client certificates not having a good status.

In some embodiments, the cache manager may determine that one of the first cache entry or the second cache entry has expired. The cache manager may generate a hash for one of the first cache entry or the second cache entry based on an issuer name, a subject name and a response. The cache manager may store one of the first cache entry or the second cache entry from responses to the OCSP responder separate from cache entries of responses to a second OCSP responder. In certain embodiments, the SSL engine may determine to establish the third SSL connection based on the first cache entry identifying the status of the first client certificate as good and the first cache entry has not expired.

In still another aspect, the present invention is related to a method of determining a status of a client certificate from a plurality of responses for an Online Certificate Status Protocol (OCSP) request. The method includes identifying, by an intermediary device between a plurality of clients and one or more servers, a plurality of Online Certificate Status Protocol (OCSP) responders for determining a status of a client certificate responsive to receiving the client certificate from a client during a Secure Socket Layer (SSL) handshake. Each of the plurality of OCSP responders may transmit a request for the status of the client certificate to a uniform resource locator corresponding to each OCSP responder. The intermediary device may determine a single status for the client certificate from a plurality of statuses of the client certificate received via responses from each uniform resource locator.

In some embodiments, the intermediary device identifies the plurality of OCSP responders based on a certificate authority of the client certificate. The method may include identifying the uniform resource locator corresponding to each OCSP responder via a configuration parameter for each OCSP responder. In one embodiments, the method includes identifying a priority assigned to each OCSP responder of the plurality of OCSP responders. In certain embodiments, the method includes identifying an order of each OCSP responder in the plurality of OCSP responders. The method may also include identifying a weight assigned to each OCSP responder of the plurality of OCSP responders.

In some embodiments, the intermediary device may determine the single status of the client certificate by applying a policy to the plurality of statuses. The intermediary device may determine the single status of the client certificate by using a status from the plurality of statuses that first identifies one of a good or revoked status. The intermediary device may determine the single status of the client certificate by identifying a status from the plurality of statuses with one of a highest priority or one of a highest weight. The intermediary device may determine the single status of the client certificate by applying a function to the plurality of statuses.

In yet another aspect, the present invention is related to a system of determining by an intermediary device a status of a client certificate from a plurality of responses for an Online Certificate Status Protocol (OCSP) request. The intermediary device is located between a plurality of clients and one or more servers. The system includes an intermediary device identifying a plurality of Online Certificate Status Protocol (OCSP) responders for determining a status of a client certificate responsive to receiving the client certificate from a client during a Secure Socket Layer (SSL) handshake. Each OCSP responder of the plurality of OCSP responders may transmit a request for the status of the client certificate to a uniform resource locator corresponding to each OCSP responder. An SSL engine of the intermediary device may determine a single status for the client certificate from a plurality of statuses of the client certificate received via responses from each uniform resource locator.

In some embodiments, the intermediary device determines the plurality of OCSP responders based on a certificate authority of the client certificate. Each OCSP responder may identify the uniform resource locator via a configuration parameter. The SSL engine may identify a priority assigned to each OCSP responder of the plurality of OCSP responders. The SSL engine may identify an order of each OCSP responder in the plurality of OCSP responders. The SSL engine may identify a weight assigned to each OCSP responder of the plurality of OCSP responders. The SSL engine may determine the single status of the client certificate by applying a policy to the plurality of statuses. The SSL engine may determine the single status of the client certificate by using a status from the plurality of statuses that first identifies one of a good or revoked status. The SSL engine may determine the single status of the client certificate by identifying a status from the plurality of statuses with one of a highest priority or one of a highest weight. The SSL engine may determine the single status of the client certificate by applying a function to the plurality of statuses.

In yet even another aspect, the present invention is related to a method of processing an Online Certificate Status Protocol (OCSP) request in parallel to processing a Secure Socket Layer (SSL) handshake. The method includes transmitting, by an Online Certificate Status Protocol (OCSP) responder of an intermediary device between a plurality of clients and one or more servers, an OCSP request to a OCSP server for a status of a client certificate responsive to receiving the client certificate from a client during a Secure Socket Layer (SSL) handshake. The intermediary device may continue to perform remaining portions of the SSL handshake while the OCSP request to the OCSP server is outstanding. The intermediary device may establish an SSL connection for the SSL handshake. The intermediary device may determine whether to terminate or maintain the established SSL connection based on the status of the client certificate received via a response from the OCSP server.

In some embodiments, the intermediary device may identify the OCSP responder from a plurality of OCSP responders based on a certificate authority of the client certificate. The intermediary device may transmit the OCSP request as part of a batch OCSP request to the OCSP server for statuses of a plurality of client certificates. The intermediary device may transmit to the client a secret key encrypted with a public key while the OCSP request to the OCSP server is outstanding. The intermediary device may generate a random number for a pre-master secret key while the OCSP request to the OCSP server is outstanding. The intermediary device may calculate a master secret key while the OCSP request to the OCSP server is outstanding. The intermediary device may establish the SSL connection while the OCSP request to the OCSP server is outstanding. The intermediary device may establish the SSL connection responsive to receipt of the status of the client certificate from the OCSP server.

In some embodiments, the method includes determining in response to a request from the client via the established SSL connection whether to terminate or maintain the SSL connection based on the status of the client certificate received via the response. The method may include determining to terminate the established SSL connection based on the status of the client certificate corresponding to one of revoked or unknown.

In yet even another aspect, the present invention is related to a system of an intermediary device for processing an Online Certificate Status Protocol (OCSP) request in parallel to processing a Secure Socket Layer (SSL) handshake. The intermediary device resides between a plurality of clients and one or more servers. The system includes an Online Certificate Status Protocol (OCSP) responder of an intermediary device transmitting an OCSP request to a OCSP server for a status of a client certificate responsive to the intermediary device receiving the client certificate from a client during a Secure Socket Layer (SSL) handshake. An SSL engine of the intermediary device continuing to perform remaining portions of the SSL handshake while the OCSP request to the OCSP server is outstanding and establishes and SSL connection for the SSL handshake. The intermediary device may determine whether to terminate or maintain the SSL connection based on the status of the client certificate received via a response from the OCSP server.

In some embodiments, the SSL engine identifies the OCSP responder from a plurality of OCSP responders based on a certificate authority of the client certificate. The SSL engine may transmit the OCSP request as part of a batch OCSP request to the OCSP server for statuses of a plurality of client certificates. The SSL engine may transmit to the client a secret key encrypted with a public key while the OCSP request to the OCSP server is outstanding. The SSL engine may generate and/or transmit a random number for a pre-master secret key while the OCSP request to the OCSP server is outstanding. The SSL engine may calculate a master secret key while the OCSP request to the OCSP server is outstanding. The SSL engine may establish the SSL connection while the OCSP request to the OCSP server is outstanding. The SSL engine may establish the SSL connection responsive to receipt of the status of the client certificate from the OCSP server.

In certain embodiments, the intermediary device may determine in response to a request from the client via the established SSL connection whether to terminate or maintain the SSL connection based on the status of the client certificate received via the response. The intermediary device may determine to terminate the established SSL connection based on the status of the client certificate corresponding to one of revoked or unknown.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

The foregoing and other objects, aspects, features, and advantages of the invention will become more apparent and better understood by referring to the following description taken in conjunction with the accompanying drawings, in which.

Figure 1A:
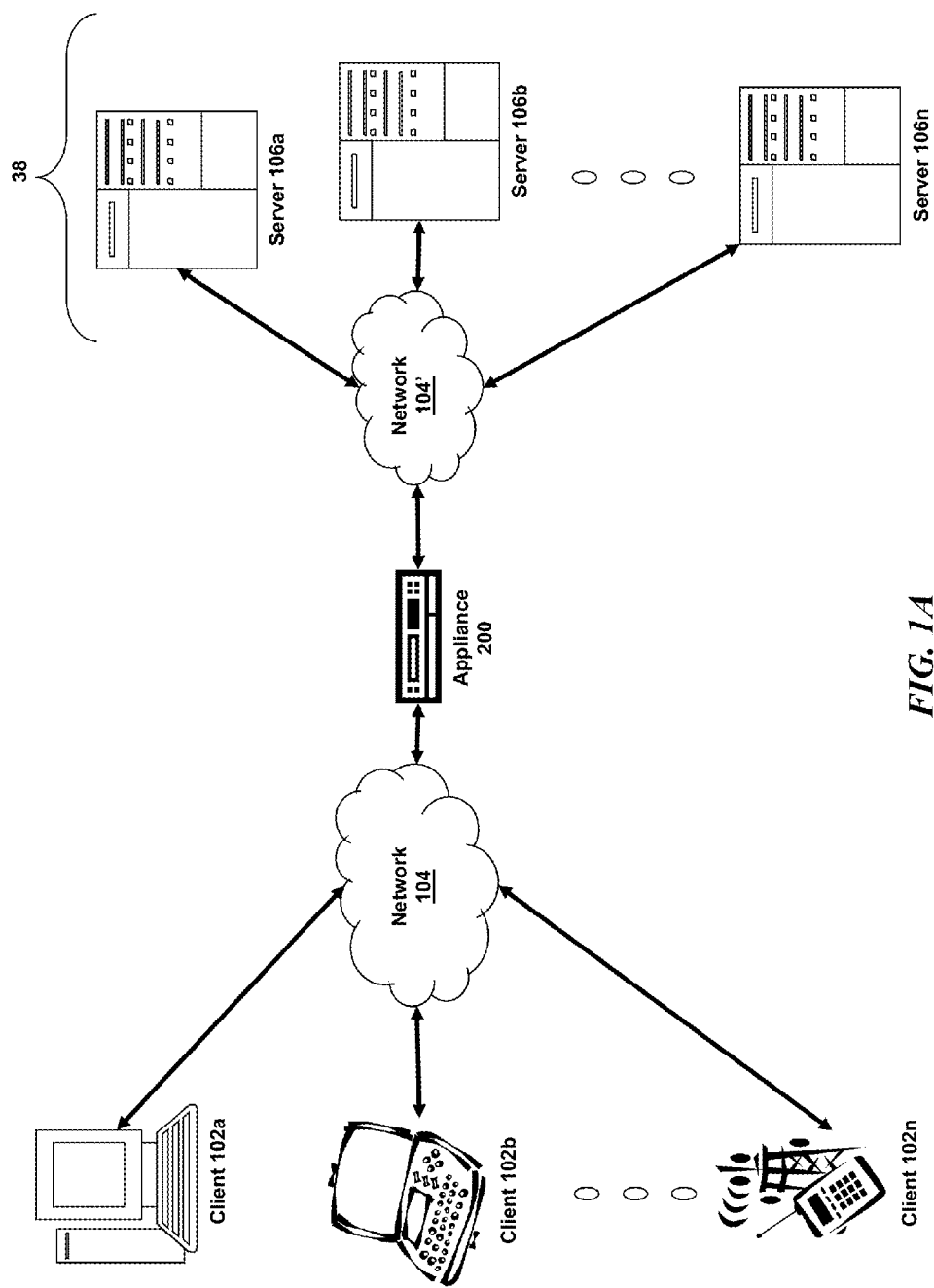
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:
- Section A describes a network environment and computing environment which may be useful for practicing embodiments described herein;
- Section B describes embodiments of systems and methods for delivering a computing environment to a remote user;
- Section C describes embodiments of systems and methods for accelerating communications between a client and a server;
- Section D describes embodiments of systems and methods for virtualizing an application delivery controller;
- Section E describes embodiments of systems and methods for providing a multi-core architecture and environment; and
- Section F describes embodiments of systems and methods for processing an OCSP response in connection with a SSL handshake.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
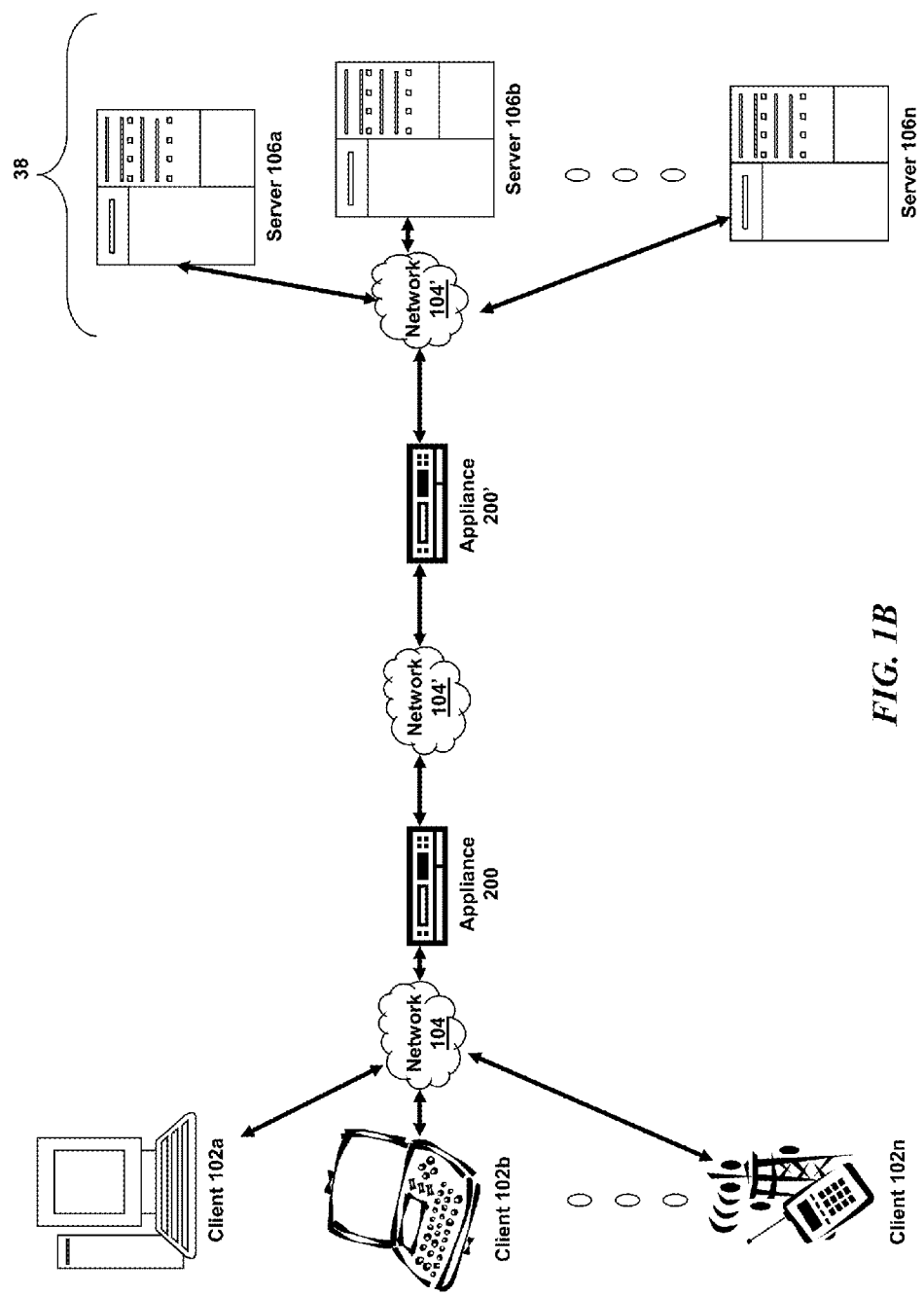
FIG. 1B is a block diagram of an embodiment of an environment for delivering a computing environment from a server to a client via an appliance.
Figure 1C:
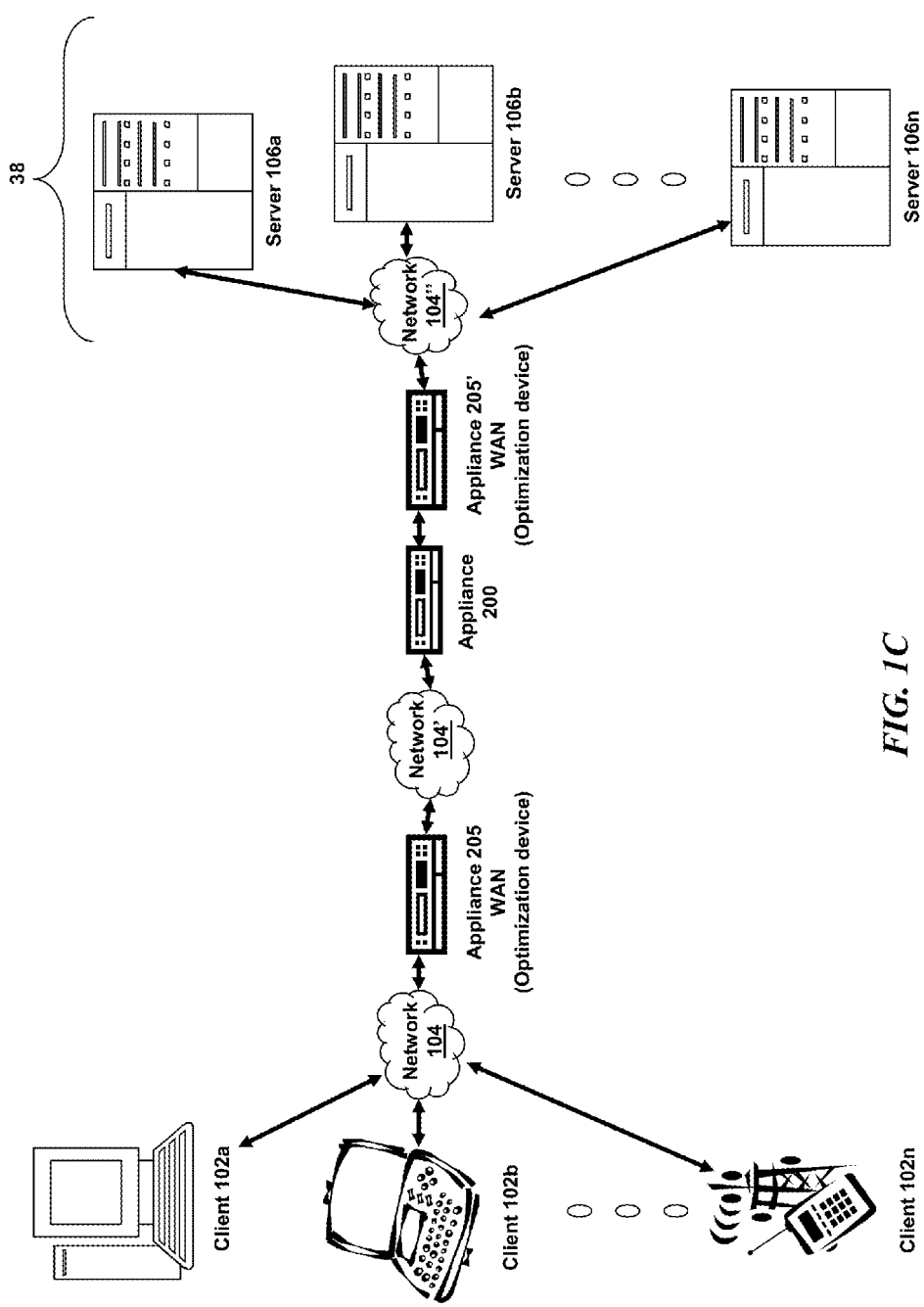
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
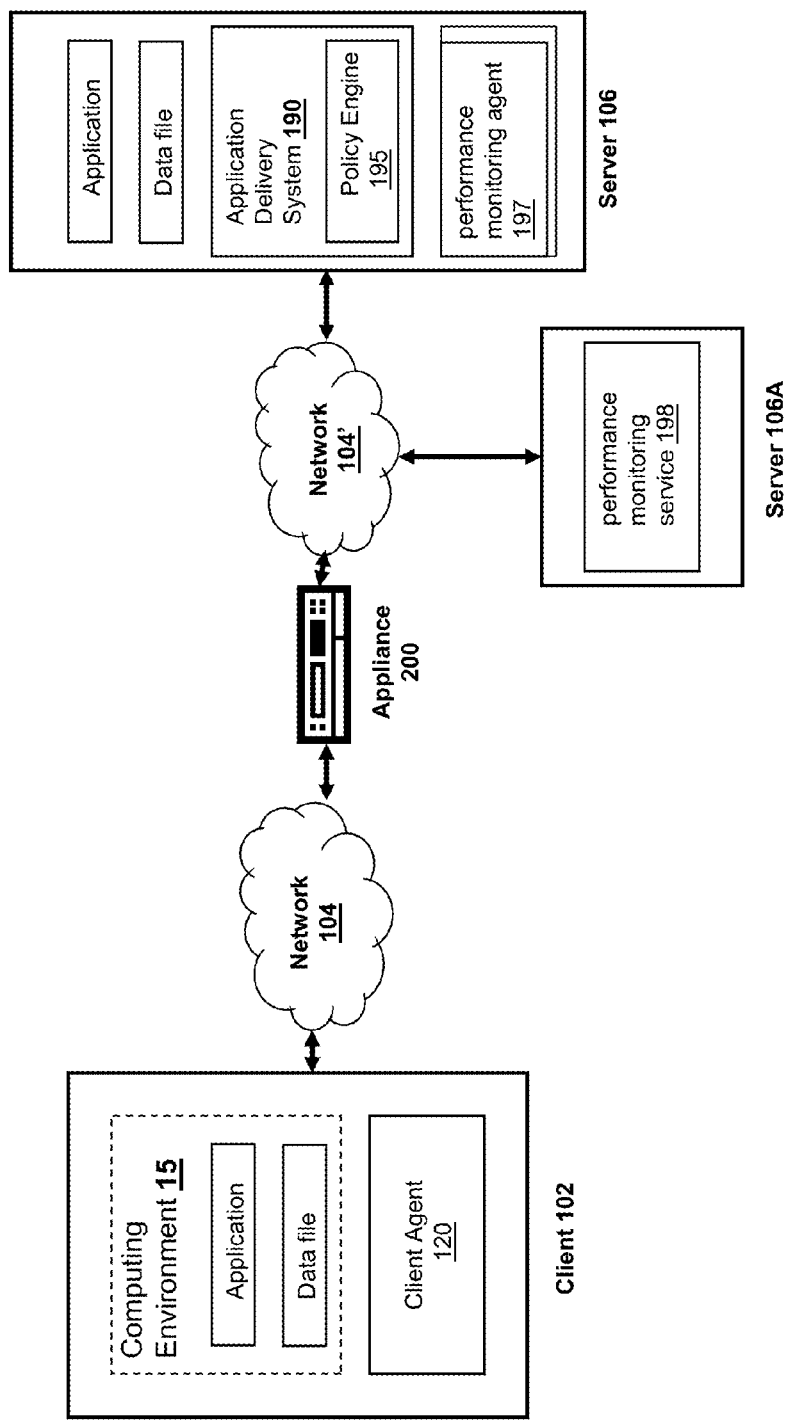
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
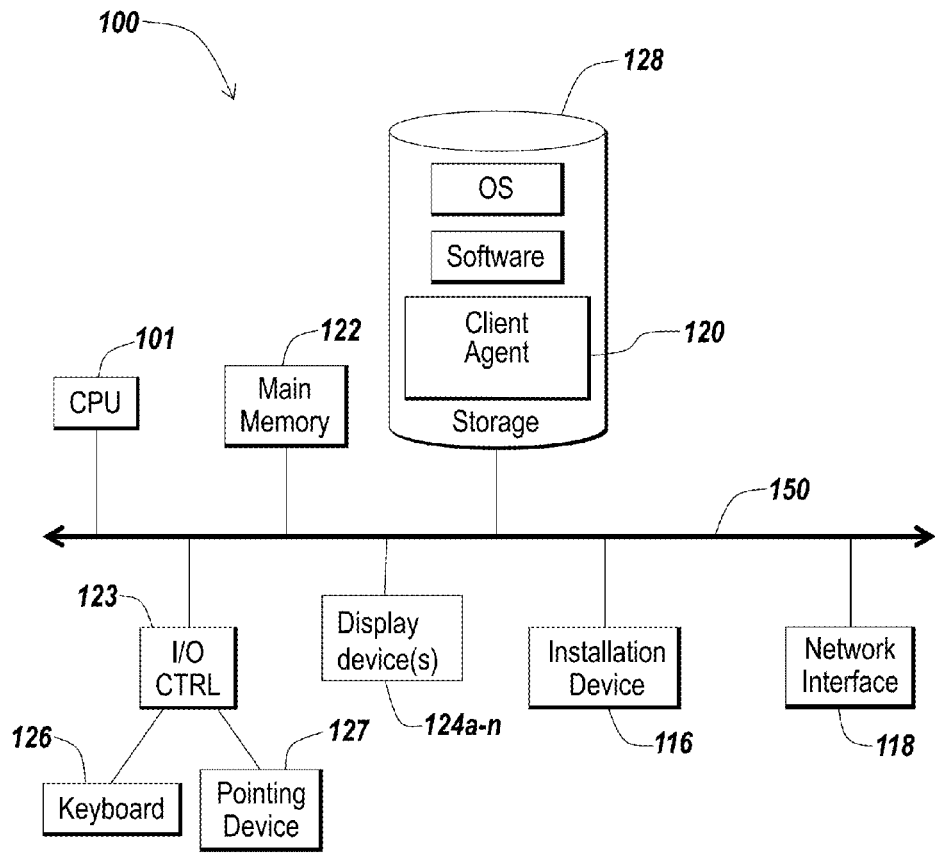
FIGS. 1E-1H are block diagrams of embodiments of a computing device.
Figure 1F:
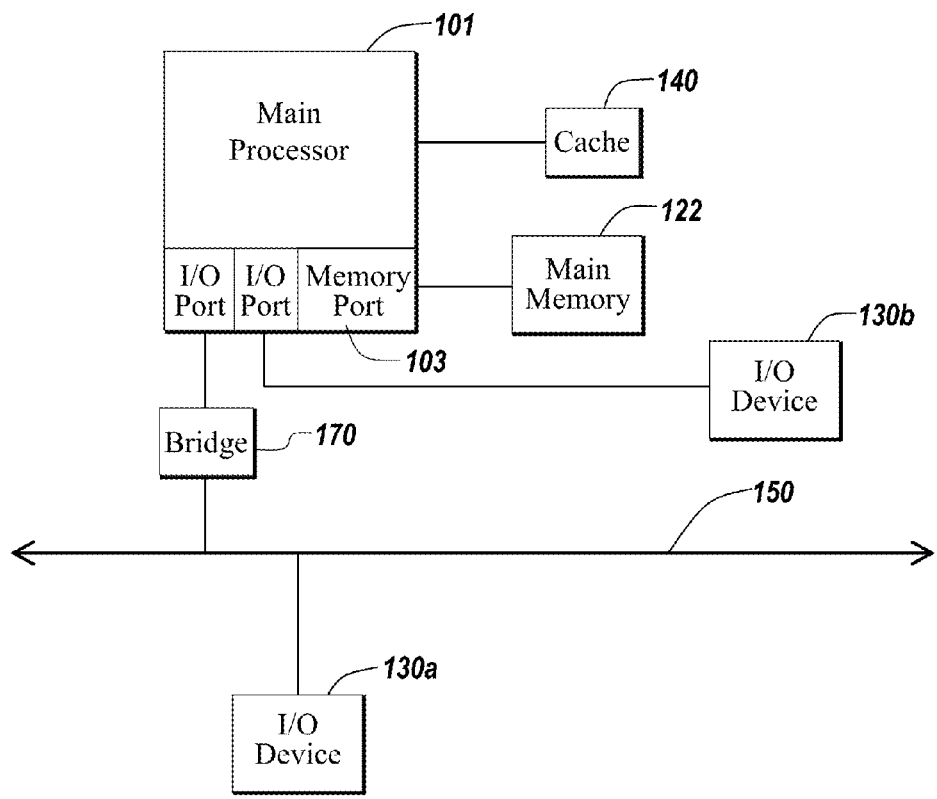

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130*b* via HyperTransport, Rapid I/O, or InfiniBand. FIG. 1F also depicts an embodiment in which local busses and direct communication are mixed: the processor 101 communicates with I/O device 130*b* using a local interconnect bus while communicating with I/O device 130*a* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
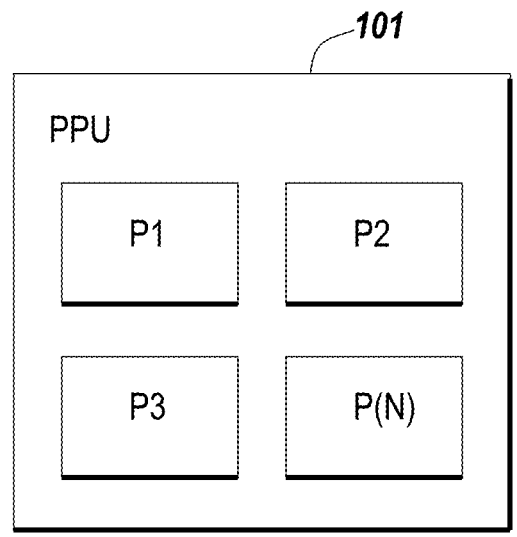

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
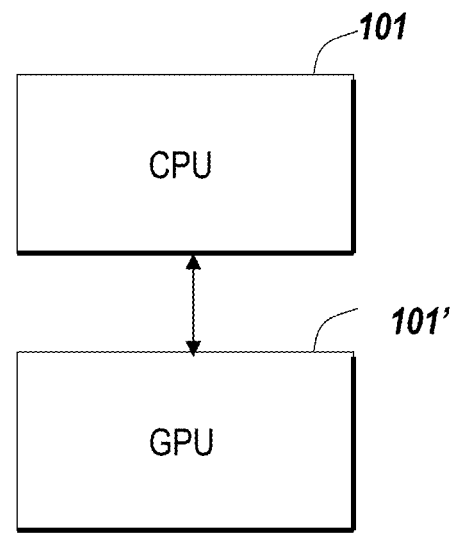

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
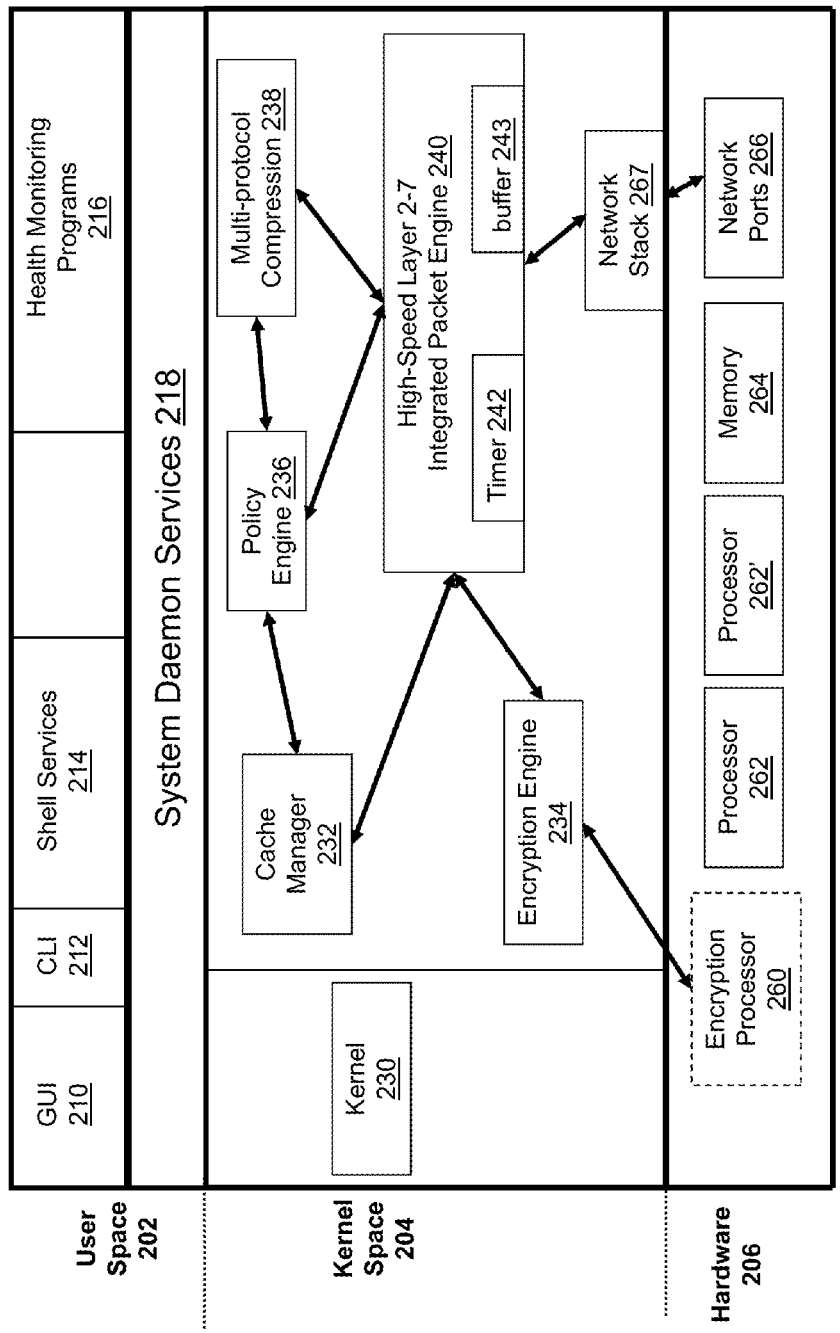
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
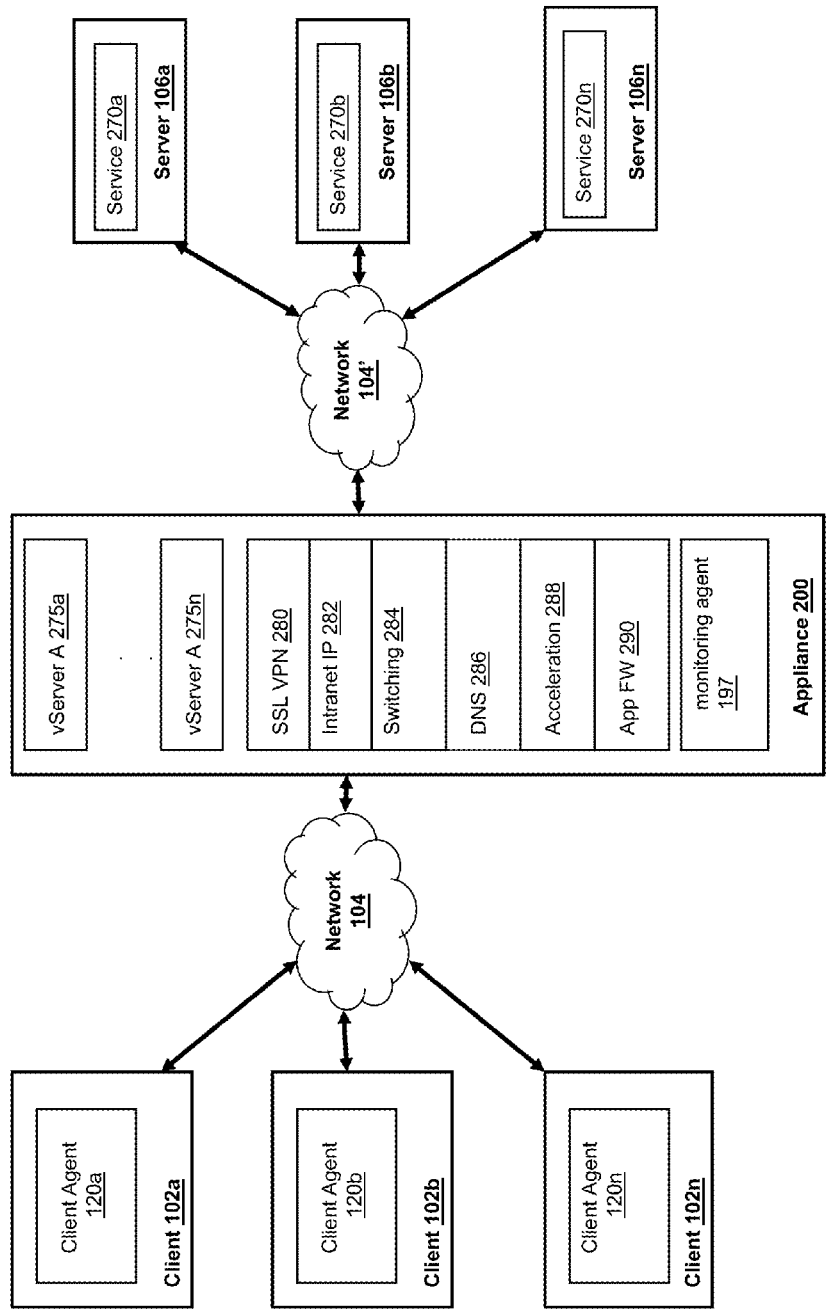
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such as an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
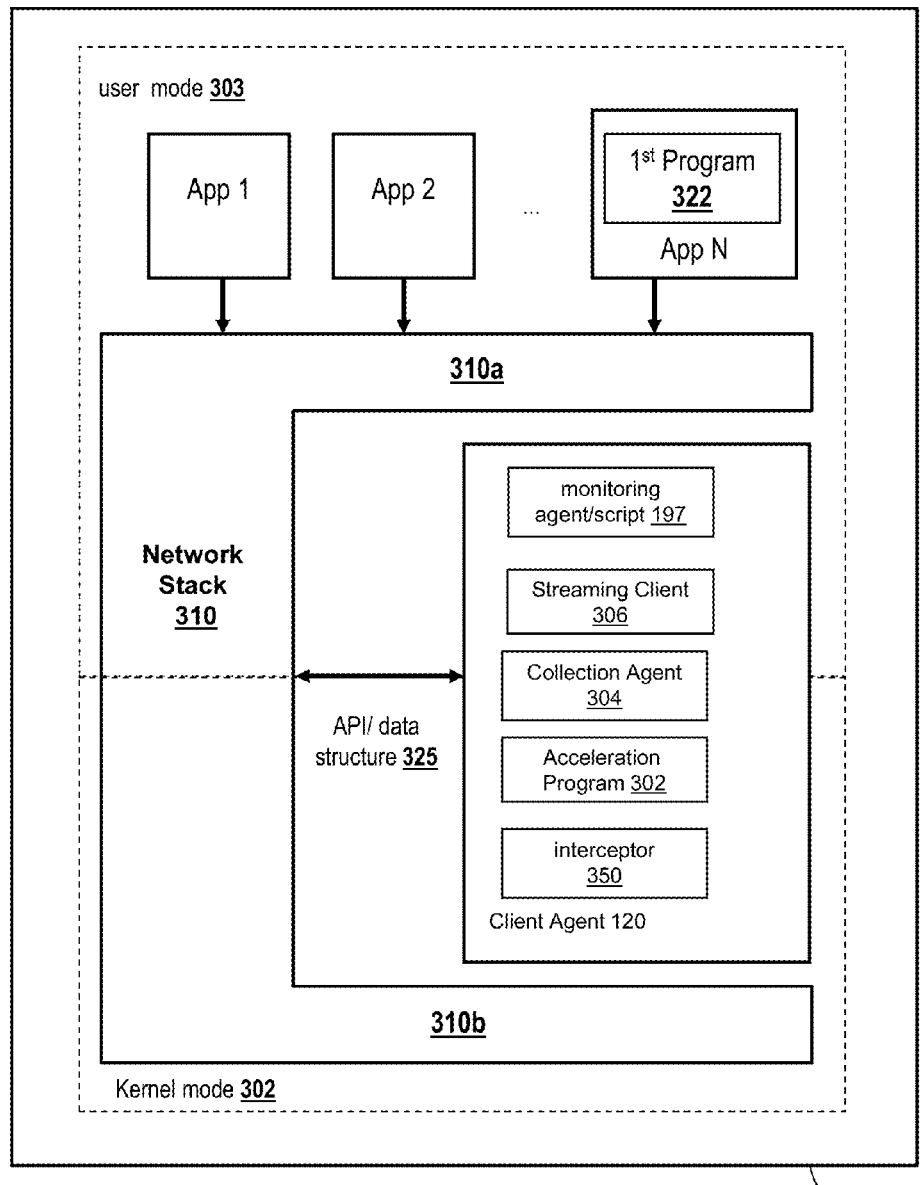
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
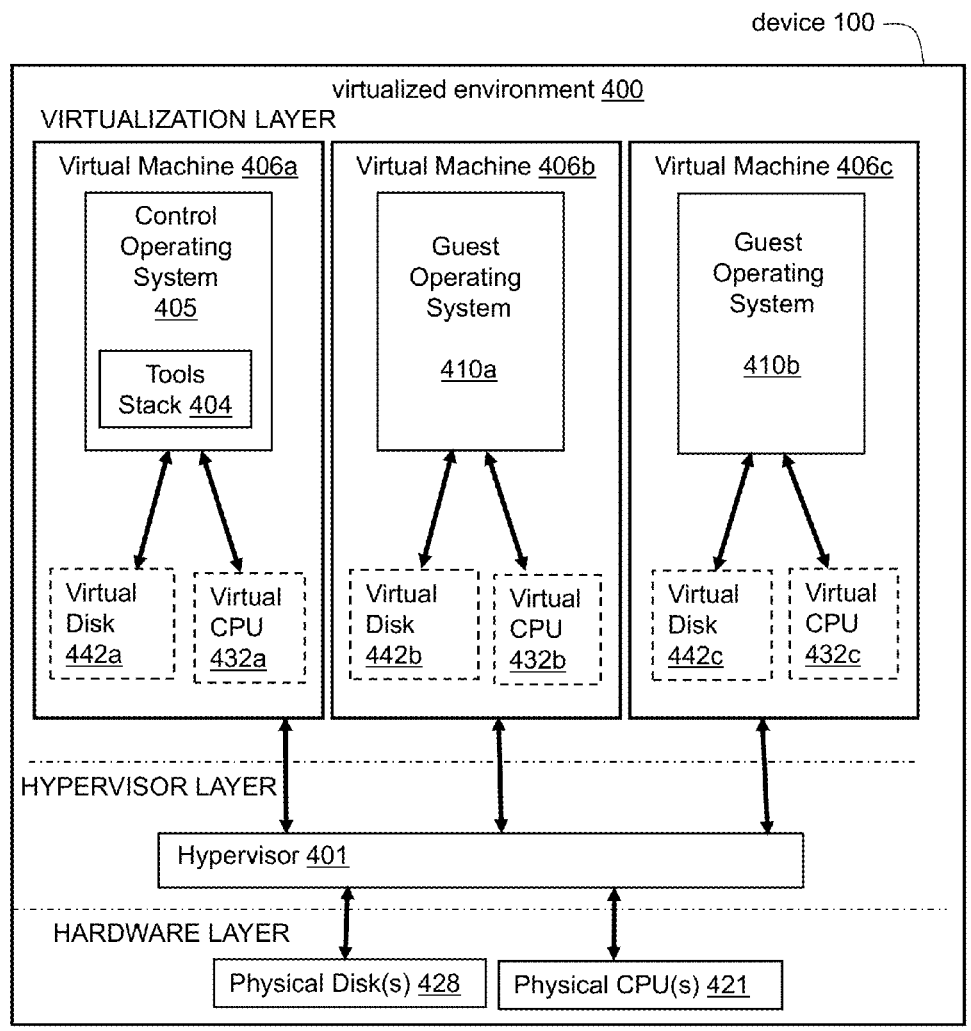
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406*a-c* (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405*a* on a computing device 100*a* may exchange data with a control operating system 405*b* on a computing device 100*b*, via communications between a hypervisor 401*a* and a hypervisor 401*b*. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100*b*), or managing virtual machines 406*b*, 406*c* on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
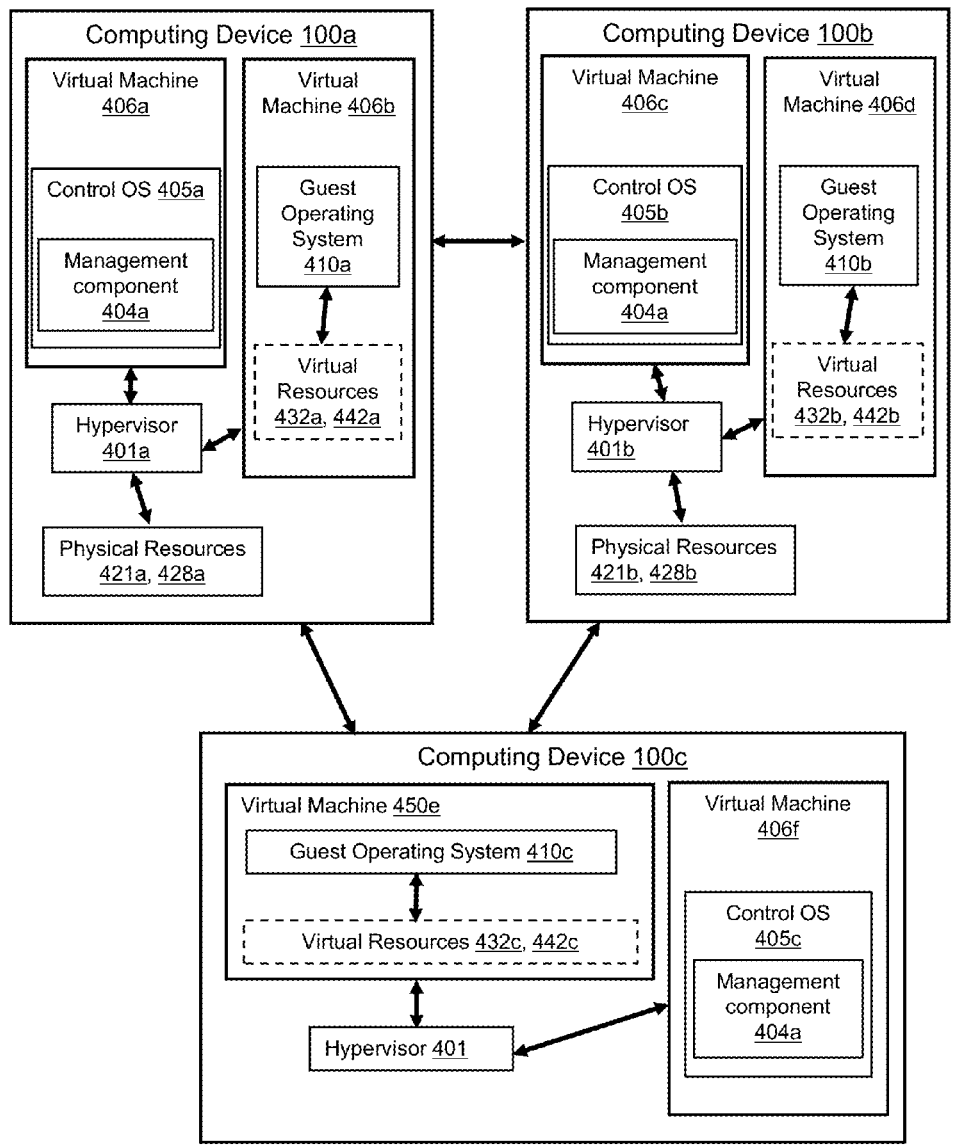
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
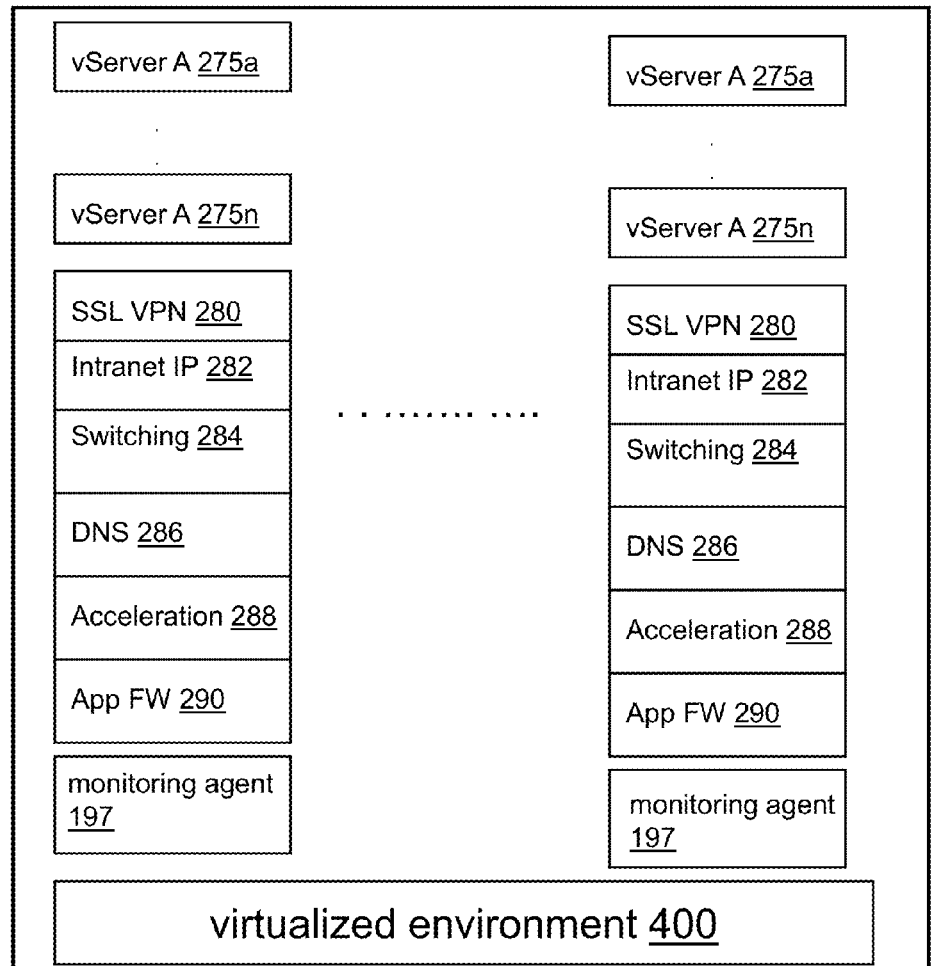
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
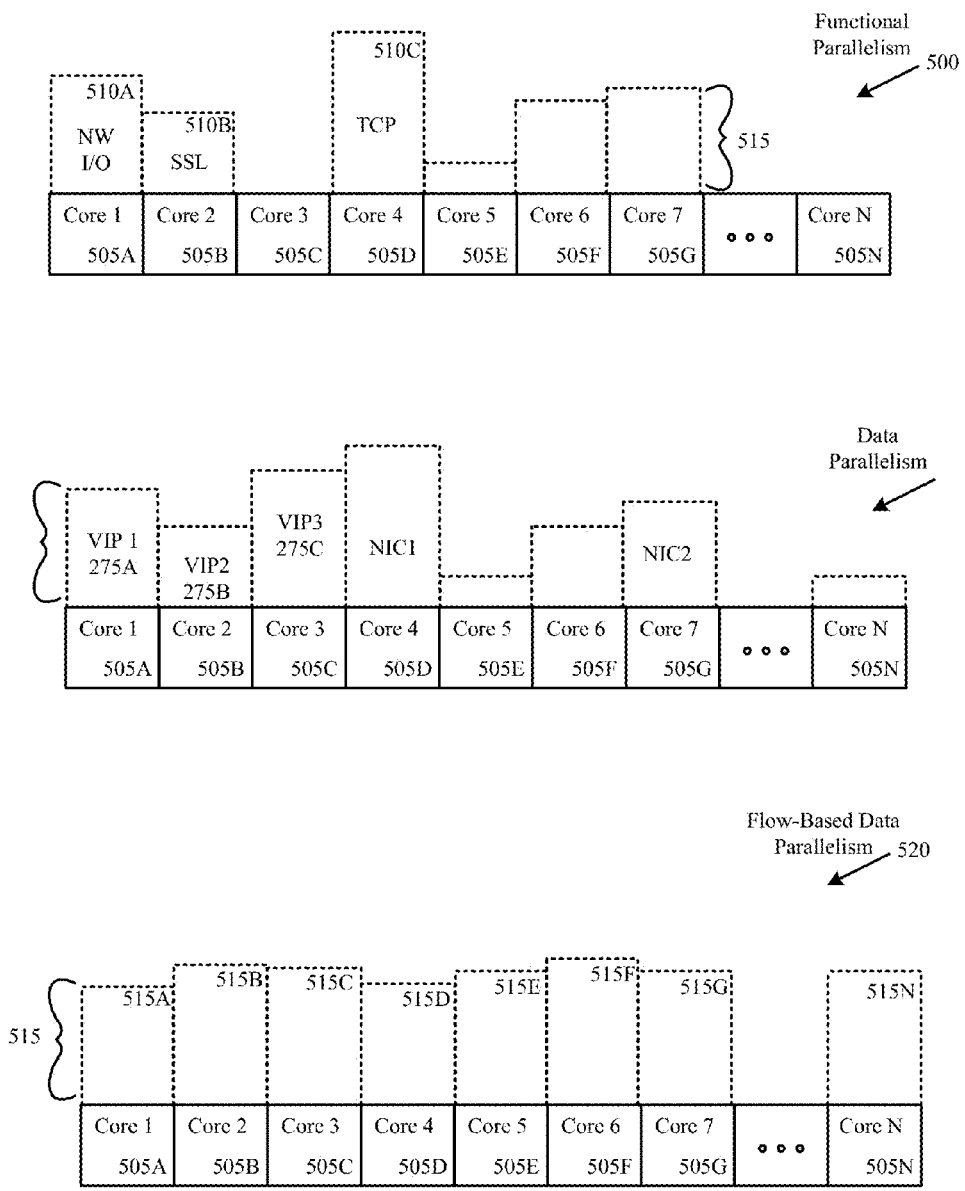
FIG. 5A are block diagrams of embodiments of approaches to implementing parallelism in a multi-core network appliance.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
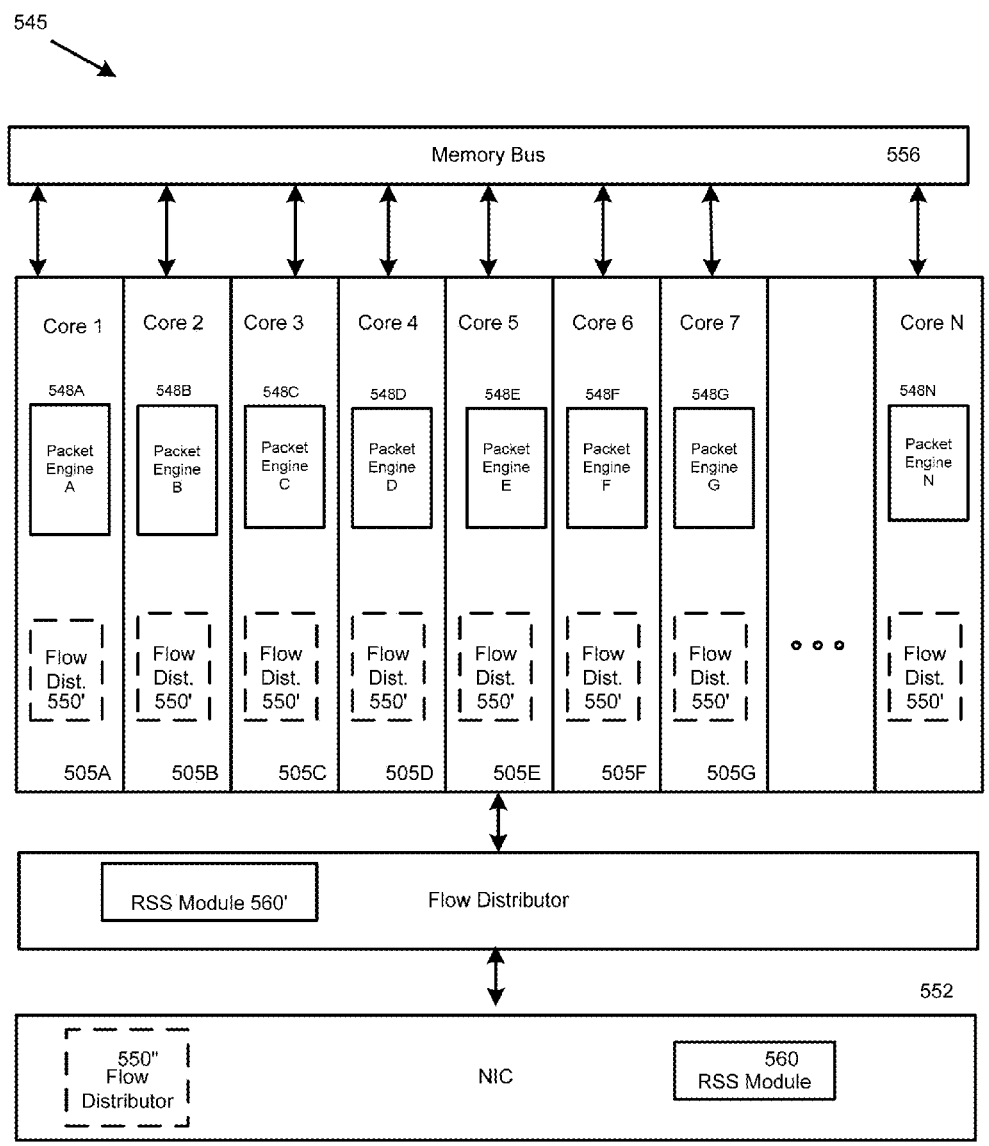
FIG. 5B is a block diagram of an embodiment of a system utilizing a multi-core network application.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hash result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
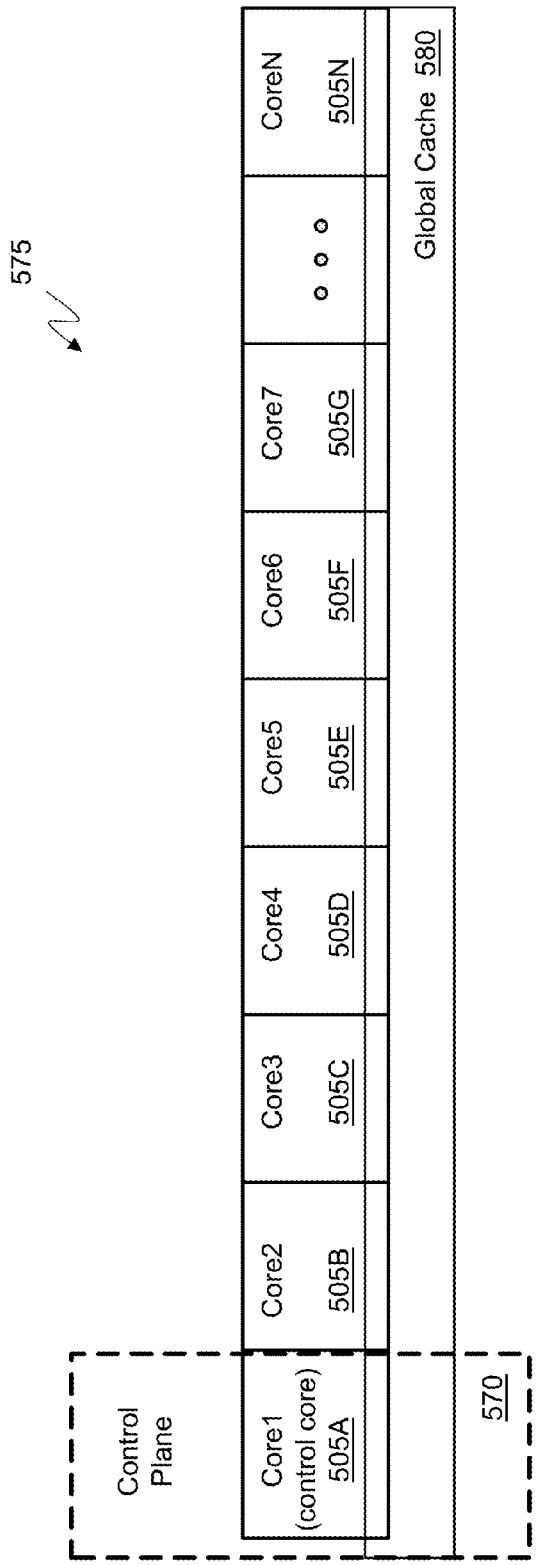
FIG. 5C is a block diagram of an embodiment of an aspect of a multi-core network appliance.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Processing OCSP Responses in Connection with SSL Handshake Processes In data communications between at least one client device and at least one server, an intermediary device 200 (hereafter sometimes referred to as "intermediary" or "appliance") may reside between the at least one client device 102 and at least one server 106. A certificate 678 of a client device may be validated in connection with a request to initiate a communications link via the intermediary device 200. The intermediary device 200, or a component of the intermediary 200, may receive the certificate 678 and determine the status of the certificate. Online Certificate Status Protocol (OCSP) may be available and/or supported by the intermediary 200. OCSP can be utilized to verify the certificate revocation status of the certificate 678.

Figure 6A:
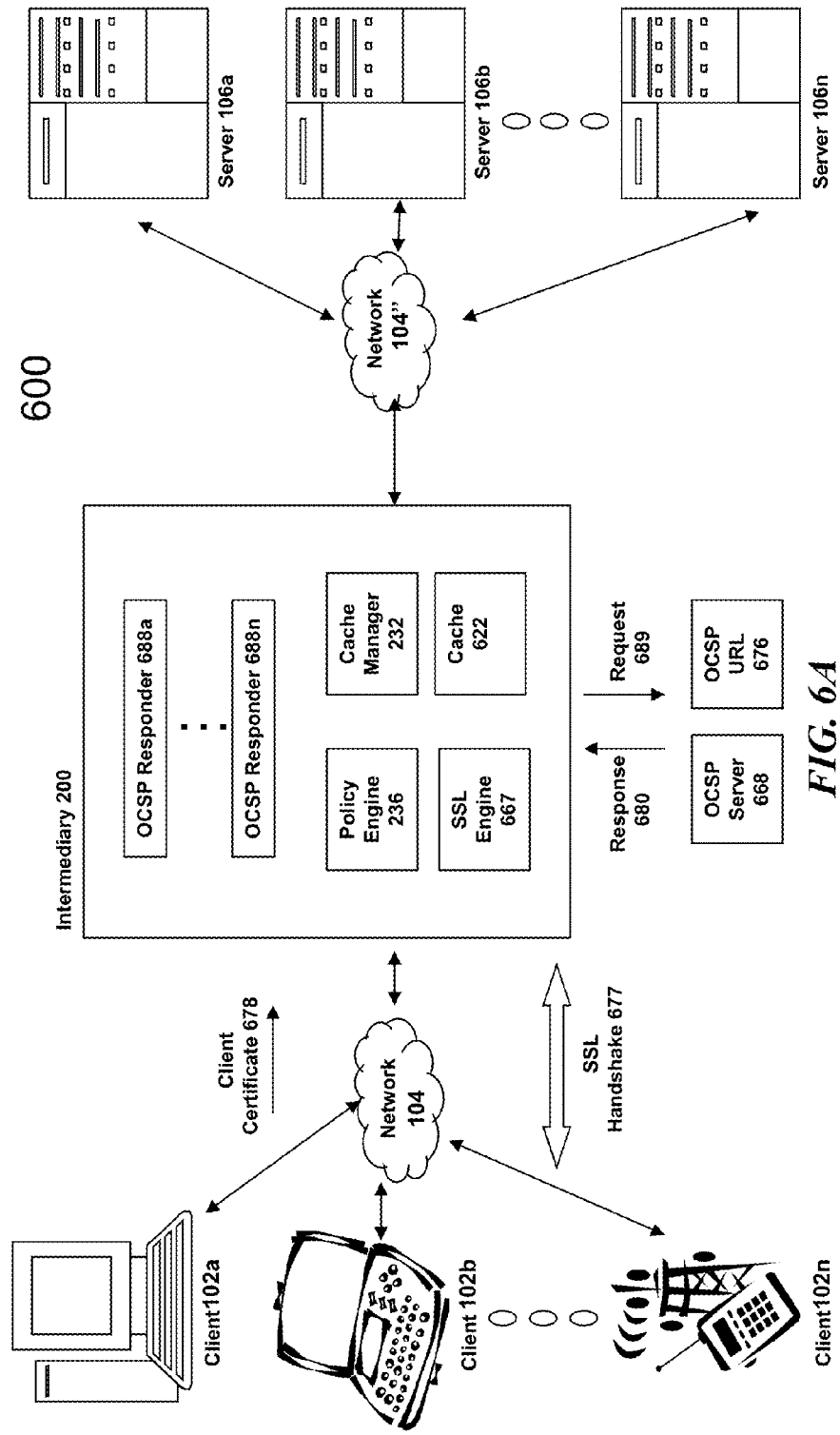
FIG. 6A is a block diagram of an embodiment of a system utilizing OCSP to validate certificates.

Referring to FIG. 6A, an embodiment of a system 600 for managing one or more OCSP responses in connection with one or more SSL handshake processes is depicted. In brief overview, the system includes the intermediary 200, at least one client 102, at least one server 106 and an OCSP server 668. The intermediary 200 includes an SSL engine 667 interoperating with at least one OCSP responder 688, and may be supported by one or more of: a policy engine 236, a plurality of policies, a cache manager 232 and a cache 622. A client 102 may send a connection request to initiate a SSL handshake 677 with the intermediary 200. As part of the SSL handshake 677, the client may send a client certificate 678 to the intermediary 200 for validation.

OCSP is a protocol used to determine the status of a digital certificate, such as a certificate of a device, user or organization. In some embodiments, the digital certificate is a SSL certificate. A digital certificate (hereafter sometimes generally referred to as "certificate"), may be issued or otherwise generated by a certificate authority (CA), which may be any entity designated and/or adapted for providing and/or managing certificates 678. In some embodiments, a CA may be a trusted third-party. A certificate may be an electronic document which uses a digital signature to bind a public key with an identity (e.g., an identifier or address of a device, person or organization). In certain embodiments, a CA provides the digital signature. In some embodiments, a certificate 678 can further include any type or form of information, including but not limited to a certificate identifier (e.g., serial number), signature algorithm, certificate validity information, purpose (e.g., for encryption or for verifying a signature) and a security hash. In some embodiments, a certificate 678 includes an authority information access (AIA) extension that indicates how to access CA information and services of the issuer of the certificate. CA information and services may include on-line validation services and CA policy data.

Features of the OCSP supported by the intermediary 200 may include features specified in the Internet Engineering Task Force (IETF) standards, such as RFC 2560 and/or RFC 5019. OCSP may be used in conjunction with or as an alternative to certificate revocation lists (CRLs). In some embodiments, OCSP may provide several advantages over the traditional CRL method, for example, centralized administration (e.g., by the OCSP respondent/server), less compute and disk load on the client (e.g., dedicated OCSP respondent(s)/server(s)), and greater resistance to tampering (e.g., secured OCSP respondent(s)/server(s)). As used herein, OCSP shall generally refer to any collection of standard, custom and/or modified features that supports and/or implements OCSP feature and functionality.

An entity that relies on the content of a certificate may perform some level of checking before accepting the certificate as valid. For example, the checking process may include verifying that the certificate has not been revoked. In this context, OCSP provides a request/response protocol where an OCSP client retrieves certificate revocation status from an OCSP responder 688. In various embodiments, the OCSP client sends a OCSP request to the OCSP responder 688 to validate the certificate 678. The OCSP responder 688 can respond with an OCSP response, which may include a status of the certificate. The status may, for example, indicate whether the certificate has been revoked and/or if the certificate is still valid. The OCSP client may be a web browser that wants to check the validity of a certificate provided by a web server. In some embodiments, the OCSP responder 688 is associated with the CA that issued the certificate.

In one embodiment, the intermediary device 200, or a component of the intermediary 200 (e.g., SSL engine 667), may be identified as or configured to behave or act as an OCSP client that seeks to determine the validity of the certificate 678. The intermediary 200 can provide functionality that serves as an OCSP server 668 to the OCSP client. For example and in one embodiment, the intermediary 200 may provide an OCSP responder 688 or service 688 for validating client certificates. This OCSP responder 688 or service 688 (hereafter sometimes referred to as "OCSP responder" or "responder") may be provided via a vserver 275 or packet engine executing on the intermediary 200. In another embodiment, the intermediary 200 may provide and/or assign at least a portion of one or more cores in provisioning the OCSP responder 688. An OCSP responder 688 may include any application, program, library, script, process, virtual machine, task, thread or any type and form of executable instructions.

In some embodiments, the OCSP responder 688 provides certificate revocation status and/or other responder functionality. The OCSP responder 688 may provide certificate revocation status and/or other responder functionality by accessing or interacting with at least one other entity. Such an entity may be, but is not limited to, a second OCSP responder 688*b*, a cache 622 or storage device (e.g., a disk of a storage area network), a server (e.g., OCSP server 668) and a CA. For example and in one embodiment, the OCSP responder 688 of the intermediary 200 may act as an OCSP client to the second OCSP responder 688*b* which provides the certificate status. This entity may reside on the intermediary 200, for example, as a local cache 622 or a second OCSP responder 688*b* provided by the intermediary 200. The entity may also reside on the network 104 and communicate with the OCSP responder 688 over the network 104. In other embodiments where the OCSP responder 688 communicates with multiple entities, these entities may reside in any configuration between the intermediary 200 and the network 104.

In some embodiments, the OCSP responder 688 may be a OCSP vserver 275 executing on the intermediary 200. The OCSP vserver 275 may include some or all features of a OCSP server 668, or may be an interface bound to an OCSP server 668 on the network 104. The intermediary 200 may provide or execute at least one OCSP responders 688*a*-*n*. In some embodiments, each of the OCSP responders may be associated with or assigned to at least one of: a CA, a client 102, a server 106, a connection type, a group of clients 102, a server farm, a server cluster, an OCSP server 668 and a cache 622. In one embodiment, the intermediary 200 may direct an OCSP request to one or more OCSP responders 688 based on the association or assignment. The association or assignment may be configured or stored in a table, hash, or other data structure, for example in the cache 622 or a storage device. In some embodiments, the intermediary 200 may change or otherwise update the association or assignment dynamically, e.g., based on some event such as upon decommissioning a CA or an OCSP server 668.

The intermediary 200 may direct an OCSP request to one or more OCSP responders via any type or form of load balancing or distribution process. A flow distributor 550 of the intermediary 200 may direct an OCSP request to one or more OCSP responders. The intermediary 200 may identify one or more OCSP responders 688 to process an OCSP request, e.g., based on application of at least one policy by a policy engine 236. The policy may take into account one or more of: any association or assignment of the OCSP responders to the entities described above, load balancing and other distribution processes, priority of the request, information about the certificate and CA, and any assigned order, priority and/or weight of the OCSP responders. In some embodiments the OCSP responder is part of, assigned to or associated a virtual server and receives the request via the virtual server.

The policy engine 236 may include one or more features of any embodiment of the policy engines 195, 236 described above in connection with FIGS. 1D and 2A. In some embodiments, the policy engine 236 may apply one or more policies that: i) identifies one or more OCSP responders in response to receiving a certificate, ii) evaluates the status of a certificate based on one or more OCSP responses, iii) determines whether to suspend SSL handshaking while a certificate status is being determined, and iv) determines whether to establish or terminate an SSL connection or session based on the status. These features will be described in further detail here and in connection with FIGS. 7A and 7B.

In some embodiments, the intermediary 200 establishes the one or more OCSP responders. In some embodiments, the one or more OCSP responders are established responsive to receiving one or more client certificates. The intermediary 200 may establish and/or manage the one or more OCSP responders, for example, via a packet engine or SSL engine 667. The one or more OCSP responders 688 may be established at any point of time and/or responsive to any event. For example, the one or more OCSP responders 688 may be established during or upon initialization of the intermediary 200. In another embodiment, the one or more OCSP responders is established in anticipation of one or more OCSP requests, such as responsive to an request to establish an SSL session. Each OCSP responder 688 may be configured, initialized and/or established by an administrator, a program and/or a script. In some embodiments, an OCSP responder 688 may be configured with one or both of: a DNS name and an IP address URL. In certain embodiments, the OCSP responder 688 may be configured as a HTTP or HTTPS service or server. In certain embodiments, the OCSP responder 688 may be configured as an OCSP service or server.

The OCSP responder 688 may be configured, initialized or established by way of one or more commands entered and/or activated via an interface (e.g., CLI 212, GUI 210, as described above in connection with FIG. 2A). These commands may be entered or activated dynamically, in batch mode or as part of a program. By way of illustration and not to be construed as limiting in any way, one embodiment of a set of CITRIX NETSCALER commands for configuring OCSP functionality may include:

{add,set}ocspResponder<name>-url<url>[-cache <ENABLED/DISABLED>[-cacheTimeout<n>]][[-respCert <respCertName>]/[-trustResponder]] [-signingCert <signCertName>] [-AIA <USE/IGNORE/FALLBACK>] [-useNonce]

(To add, configure or set an OCSP responder 688.)

rm ocspResponder <name>

(To remove or decommission an OCSP responder 688. The "rm" command may not allow removing an OCSP responder 688 currently bound to a CA certificate. When an OCSP responder 688 is removed, the cache 622 may be flushed.)

where:

name: may be used to identify the OCSP responder 688 cache: may be used to enable or disable caching of OCSP responses cacheTimeout: may be used determine the number of seconds to cache a response respCert: may be used to identify the certificate used to sign the OCSP responses. If omitted, the CA bound to the OCSP may be used to verify responses.

trustResponder: If specified, no signature checks may be performed on the response in certain embodiments.

signingCert: may be used as a name of a certificate/key pair for signing the requests. If omitted, the responses may not be signed.

AIA: may define how an embedded OCSP URL present in some client certificates (the Authority Information Access) can be used. This parameter may be optional and can default to USE. Parameter values:

USE: may indicate to use AIA, followed by fallback to the configured responders.

IGNORE: May indicate to use the configured responders and ignore AIA.

FALLBACK: may indicate that if the queries to the configured OCSP responders fail, use the AIA defined responder.

useNonce: Can be optional; may indicate to enable the OCSP nonce extension to prevent replay attacks.

{add/set} ssl certkey <certKey>-CA -ocsp <ocspResponder>-priority <n> unset ssl certkey <certKey>-CA -ocsp <ocspResponder>

(To set or remove the OCSP responder(s) for a given CA certificate. The priority can define the order in which multiple OCSP servers 668 are queried, e.g., lower numbers queried first.)

bind ssl vserver <service/vserver><certKey>-CA -ocspCheck
<MANDATORY/OPTIONAL>

(To specify whether OCSP validation should be activated when binding a CA certificate to a vserver authenticated transaction. The ocspCheck parameter may overrides the -crlCheck parameter.)

set ssl params -ocspCacheSize <size>

(To set the per-core maximum cache size for OCSP responses. This may default to a low value, such as 10 megabytes, to prevent a denial of service attack against the intermediary 200.)

set ssl params -ocspBatchTime <time>

(To set the maximum amount of time, in milliseconds, for an OCSP responder to receive OCSP requests. After this timeout, a batched message may be sent to the OCSP server 668. In some embodiments, this setting defaults to 0. Using the default, each OCSP request may be sent to the OCSP server without batching.)

In some embodiments, a packet engine of the intermediary 200 provides the functionality to configure, initialize, establish, bind, assign, remove and/or decommission an OCSP responder 688 and/or an OCSP client in the intermediary 200. The packet engine may include one or more features of the packet engines 240, 548 described above in connection with FIGS. 2A and 5B. In some embodiments, a packet engine 240 establishes, maintains and/or otherwise manages connections and traffic between a client 102 and the intermediary 200, and between the intermediary 200 and a server 106. The packet engine may direct packets or messages from the client 102 to a particular core 661, vserver 275, service or OCSP responder 688 of the intermediary 200, e.g., via application of at least one policy by the policy engine 236. In some embodiments, a packet engine may be referred to as a packet processing engine.

In some embodiments, the packet engine provides at least a portion of the functionality of the SSL engine 667. For example and in one embodiment, the packet engine and the SSL engine 667 are the same entity. In another embodiment, the packet engine includes the SSL engine 667. In still another embodiment, the SSL engine 667 and the packet engine are different components or modules of the intermediary 200. In some embodiments, an intermediary 200 may include a plurality of packet engines and/or SSL engines, e.g., supported by a multi-core system. For example and in one embodiment, each core of the multi-core system may support a packet engine and/or an SSL engine 667.

The SSL engine 667 may comprise hardware or any combination of software and hardware. The SSL engine 667 may include an application, program, library, script, process, task, thread or any type and form of executable instructions that executes on one or more processors or cores of the intermediary 200. The packet engine and/or SSL engine 667 may incorporate any type or form of library code, such as OpenSSL OCSP client and library code, to support OCSP features and functionality. The SSL engine 667 may be designed, constructed, configured and/or adapted for initializing and establishing SSL connections and sessions between a client 102 and a intermediary 200, between a intermediary 200 and a server 106, and between a client 102 and a server 106 via the intermediary 200.

The SSL engine 667 may receive, evaluate, authenticate and/or process a connection request from a client 102. The SSL engine 667 may manage any type or form of connection handshake (e.g., SSL handshake) between any client 102, server 106 or intermediary 200 pairings. One embodiment of process steps for a SSL handshake is depicted in FIG. 7C. This and other embodiments of SSL handshake may be adapted or extended to support additional features such as OCSP certificate validation. In one embodiment, code present in OpenSSL's apps/ocsp.c libraries may be ported to the kernel of the intermediary 200 to support OCSP functionality. This code may be used to create OCSP requests and/or validate responses to the OCSP requests. In certain embodiments, OCSP awareness may be incorporated to existing SSL state machines via the SSL engine 667, e.g., to execute certificate checks as required and to establish or terminate a SSL connection based on the status of a certificate. SSL state machine changes may include but is not limited to the following: Program Communication Block (PCB) suspension, generating and sending OCSP request(s), parsing OCSP response(s), and taking required actions as defined by configuration (e.g., either denying or allowing the establishment of an SSL connection). An entity such as the packet engine or the SSL engine 667 may facilitate, control, coordinate and/or manage the interoperation of SSL handshake 677 and OCSP certificate validation.

The SSL engine 667 may communicate with one or more OCSP responders to determine a status of a certificate 678. The communication with the one or more OCSP responders may incorporate any type or form of conventional, standard or proprietary message exchange and/or handshaking methods. For example and in one embodiment, the SSL engine 667 may be associated with a first core of a multi-core system of the intermediary 200 and the OCSP responder 688 may be associated with a second core. In this embodiment, core-to-core messaging (CCM) may be utilized for communications between the SSL engine 667 and the OCSP responder 688.

In one embodiment, the SSL engine 667 may extract a client certificate 678 from an SSL handshaking message and transmit the certificate 678 to a designated OCSP responder 688. In another embodiment, the SSL engine 667 may forward a message containing the certificate 678 to the OCSP responder 688 for validation. In some embodiments, the SSL engine 667 extract information from the certificate and transmit the information to the OCSP responder 688 either processed or unprocessed. In some embodiments, the SSL engine 667 processes the extracted information into a OCSP request for transmission to the OCSP responder 688. As described herein, interactions between entities (e.g., the SSL engine 667 and the OCSP responder 688) are sometimes discussed with reference to one of each kind for illustrative purposes. It should be understood that any one of each kind may interact with multiple ones of another kind in certain embodiments of operation.

In some embodiments, the SSL engine 667 identifies one of a plurality of OCSP responders to validate a certificate. The SSL engine 667 may identify the OCSP responder 688 based on a priority and/or weight assigned to each OCSP responder 688 of the plurality of OCSP responders. The SSL engine 667 may identify the OCSP responder 688 based on an order of each OCSP responder 688 in the plurality of OCSP responders. The SSL engine 667 may identify the OCSP responder 688 based on application of one or more associated policies. The SSL engine 667 may identify the OCSP responder 688 based on a certificate authority of the client certificate 678. In certain embodiments, the SSL engine 667 may identify a plurality of OCSP responders to determine a status of a client certificate.

The SSL engine 667 may transmit any type or form OCSP request to the one or more OCSP responders. The SSL engine 667 may transmit a plurality of OCSP requests corresponding to a plurality of received client certificates. In one embodiment, the SSL engine 667 transmits one or more OCSP requests as part of a batch request associated with a plurality of client certificates. In another embodiment, the SSL engine 667 combines or consolidates a plurality of OCSP requests into a single request and transmits the single request to the OCSP responder 688. In still another embodiment, the SSL engine 667 combines a portion of the plurality of OCSP requests into one request. For example and in one embodiment, a portion of the plurality of OCSP requests may be identified based on application of a policy by the policy engine 236 and combined into one request. In another embodiments, a portion of the plurality of OCSP requests may be identified via the corresponding client certificates based on a common CA of the client certificates 678.

The SSL engine 667 may generate and/or transmit any type or form of information in supporting OCSP validation during a SSL handshake 677. For example and in one embodiment, the SSL engine 667 may generate and/or transmit to the client a secret key encrypted with a public key, such as while an OCSP request to the OCSP responder 688 or server is outstanding. The SSL engine 667 may generate a random number for a pre-master secret key, for example while an OCSP request to the OCSP responder 688 or server is outstanding. The SSL engine 667 may calculate or generate a master secret key, for example while an OCSP request to the OCSP responder 688 or server is outstanding. The SSL handshake may include any number of process steps that may or may not culminate in establishment of an SSL connection. In some embodiments, the SSL engine 667 establishes the SSL connection while an OCSP certificate status is pending. In other embodiments, the SSL engine 667 completes a part of the SSL handshaking and/or connection establishment process while an OCSP certificate status is pending. In certain embodiments, the SSL engine 667 suspends at least a part of the SSL handshaking and/or connection establishment process while a certificate status is pending.

The OCSP responder 688 may receive any type or form of request or communication from the SSL engine 667. The request or communication may include information about one or more of: the client certificate 678, an OCSP server or service for determining a status of the certificate, an URL identifying the OCSP server or service, and a digital signature. In some embodiments, the OCSP responder 688 receives an OCSP request from the SSL engine 667 in connection with a received certificate. The SSL engine 667 may generate the OCSP request in conformance with OCSP and/or certain OCSP extensions. In one embodiment, the OCSP request is signed. In certain embodiments, the OCSP request may be optionally signed. In some embodiments, the SSL engine 667 may conform the OCSP request at least in part with the OCSP protocol. The SSL engine 667 may generate the OCSP request to incorporate features and/or data formats described by Abstract Syntax Notation One (ASN.1).

Figures 6B, 6C:
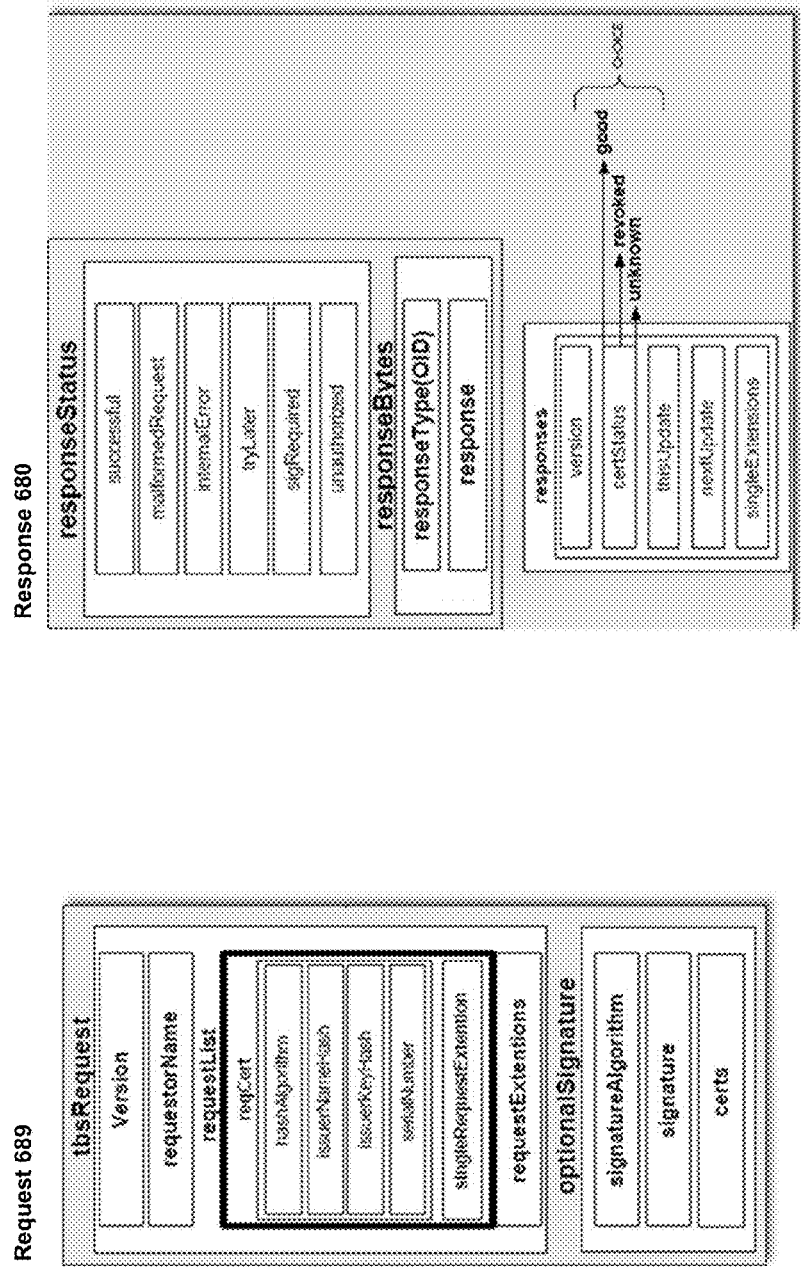
FIG. 6B a representation of an embodiment of an OCSP request.
FIG. 6C a representation of an embodiment of an OCSP response.

In some embodiments, the OCSP request may include any one or more of, but not limited to: a version of OCSP supported, a priority of the request, OCSP extensions supported or required, algorithm(s) for an associated signature, algorithms for accessing a status of a certificate, and information about the certificate (e.g., an identifier of the certificate). By way of illustration, FIG. 6B depicts one embodiment of a representation of an OCSP request. By way of illustration and not intended to be limiting in any way, one embodiment of an OCSP request includes the following structure:

```
OCSPRequest     ::=SEQUENCE {
tbsRequestTBSRequest,
    optionalSignature      EXPLICIT Signature may be OPTIONAL
}
TBSRequest::=SEQUENCE {
VersionEXPLICIT Version DEFAULT v1,
    requestorNameEXPLICIT GeneralName OPTIONAL,
    requestListSEQUENCE OF Request,
    requestExtensions      EXPLICIT Extensions may be OPTIONAL
}
Signature       ::=        SEQUENCE {
signatureAlgorithm         AlgorithmIdentifier,
    signature              BIT STRING,
    certs                  EXPLICIT SEQUENCE OF
                           Certificate may be OPTIONAL
}
Version         ::=        INTEGER { v1(0) }
Request         ::=        SEQUENCE {
reqCert                    CertID,
    singleRequestExtensions    EXPLICIT Extensions may be
                               OPTIONAL }
CertID          ::=        SEQUENCE {
```

```
hashAlgorithm     AlgorithmIdentifier,
  issuerNameHash      OCTET STRING
                        (Hash of Issuer's DN)
  issuerKeyHash       OCTET STRING
                        (Hash of issuer'spubkey)
  serialNumber        CertificateSerialNumber
}
```

The intermediary 200 may support one or more extensions or features of the OCSP protocol. In some embodiments, the intermediary 200 may support the Number Used Once ("nonce") extension. In some embodiments, the nonce extension helps to prevent replay attacks. The nonce extension may add a cryptographically strong unique number (i.e., nonce) to the message in generating the signature. The nonce can cryptographically bind a request and a response to make replay attacks difficult or impossible. One embodiment of the nonce extension is documented in §4.4.1 of [RFC2560]. For example and in one embodiments, the OCSP server 668 (or responder) may replay the nonce sent in an OCSP request and if the OCSP request and OCSP response nonce do not match, the OCSP response may be rejected.

The OCSP request may be transmitted using any standard, custom and/or proprietary protocol. In some embodiments, the OCSP request may be transmitted using Hypertext Transfer Protocol (HTTP). In other embodiments, the OCSP request may be transmitted using HTTPS. In certain embodiments, if the OCSP transaction is small enough (i.e., less than 255 bytes), HTTP GET may be used to submit the OCSP request. Otherwise, HTTP POST may be used to submit the OCSP request. By way of illustration, one embodiment of the HTTP GET syntax may be represented as follows:

GET {url}/{url-encoding of base-64 encoding of the DER encoding of the OCSP Request}

By way of illustration, one embodiment of an OCSP request using the POST method may be constructed and/or configured as follows: The Content-Type header may have the value "application/ocsp-request". The body of the message may include a binary value of the distinguished encoding rules (DER) encoding for the OCSP request. Based on the OCSP request received from the SSL engine 667, the OCSP responder 688 may access one or more caches 622 to determine a status of the client certificate 678.

To provide the OCSP service, the intermediary 200 may support any form or type of data structures for storing and/or looking-up OCSP servers 668 and certificate information. In some embodiments, the intermediary 200 is designed and/or configured to provide kernel data structures to store OCSP information such as certificate statuses. The data structures may be implemented in a cache 622. In some embodiments, the data structure for storing certificate information may include features and functionality substantially similar to, or the same as data structures for a CRL. OCSP responses from an OCSP server 668 may be stored or cached in these data structures. These data structures may be available for adding flags and/or fields to SSL vservers 275 and services in support of new or existing OCSP configuration options. In some embodiments, the OCSP configuration may share existing CRL flags or adapt existing CRL flags for use. In one embodiment, flags relating to authentication requirements may be shared and/or adapted. For example and in one embodiment, a flag that indicates that a CRL check is mandatory may be extended to mean that an OCSP check is mandatory.

In certain embodiments such as embodiments supporting a multi-core system, caching may be based on a distributed hash table. Each packet engine or SSL engine 667 may make a cache request (e.g., via an OCSP responder 688) for a client certificate. If the cache request is unsuccessful, the packet engine, SSL engine 667 or an OCSP responder 688 may send a request (e.g. OCSP request) to an OCSP server 668. In various embodiments, the OCSP responder 688, packet engine or SSL engine 667 may update the cache 622 with information received in a response 680 to the request 689.

In some embodiments, based on the OCSP request from the SSL engine 667, the OCSP responder 688 may access one or more OCSP servers 668, services or other responders (hereafter sometimes generally referred to as "OCSP servers") to determine a status of the client certificate 678. The OCSP responder 688 may identify one or more caches 622 and/or OCSP servers to access based on a configuration of the intermediary, the OCSP responder 688, the SSL engine 667 and/or the packet engine. The intermediary may identify the one or more caches 622 and/or OCSP servers to access via a cache manager 232 and/or an OCSP responder 688. The intermediary 200 may identify the one or more caches 622 and/or OCSP servers to access based on application of a policy by the policy engine 236. The intermediary 200 may identify the one or more caches 622 and/or OCSP servers to access based on information regarding any one or more of: a client certificate, an associated CA, the client, and the requested SSL connection. The intermediary 200 may access the one or more caches 622 prior to accessing the one or more OCSP servers, or vice versa. The OCSP responder 688 may access one or more caches 622 and/or OCSP servers 668 in any order until a certificate status is determined (e.g., a first status is available) or validated (e.g., a status is validated by two or more devices or modules).

In certain embodiments, the intermediary 200 includes a cache manager 232. The OCSP responder 688 may access one or more caches 622 via the cache manager 232. Each of the one or more caches 622 may store, maintain and/or organize any type or form of data, e.g., certificate revocation statuses and other OCSP or certificate related information. The cache 622 may incorporate any one or more features of any embodiment of the cache 140 or storage devices 122, 128, 264, 428 described above in connection with FIGS. 1E, 2A and 4A. In some embodiments, the OCSP responder 688 accesses the one or more caches 622 directly.

The cache manager 232 may include any type or form of hardware and/or combination of hardware and software. The cache manager 232 may be designed and constructed to control all manner of read/write access to one or more caches 622. The cache manager 232 may include any feature of any embodiment of the cache manager 232 described above in connection with FIG. 2A. The cache manager 232 may include any application, program, library, script, process, task, thread or any type and form of executable instructions that executes on any processor or core of the intermediary 200. The cache manager 232 may be designed and constructed to organize and/or partition a cache 622 into a plurality of partitions. For example and in one embodiments, the cache manager 232 may assign a cache 622 or cache partition to an OCSP responder 688 or a CA.

The cache manager 232 may manage, organize and/or provide access to data structures containing certificate and OCSP information. The cache manager 232 may retrieve and/or process information from the cache 622 or cache partition, e.g., on behalf of the intermediary 200 or in response to a request from the OCSP responder 688 or SSL engine 667. The cache manager 232 may determine a status of a certificate and provide the status to the OCSP responder 688. In some embodiments, the OCSP responder 688 identifies a certificate to the cache manager 232. Based on the identification, the cache manager 232 may provide information regarding the identified certificate. For example and in some embodiments, the cache manager 232 may indicate to the OCSP responder 688 a location in the cache 622 to access any required information (e.g., a status of the certificate). In other embodiments, the cache manager 232 may provide the required information after retrieval from the cache 622 and/or processing.

In some embodiments, the OCSP responder 688 accesses an OCSP server 668 by transmitting an request. In some of these embodiments, the request is an OCSP request. In other embodiments, the request may include some or all of the information from the OCSP request described above. In certain embodiments, the OCSP responder 688 forwards the OCSP request received from the SSL engine 667 to the OCSP server 668. The OCSP responder 688 may forward the OCSP request unchanged to the OCSP server 668 or may process the OCSP request before transmitting to the OCSP server 668. The processing can include any form or type of processing, such as header change, encryption, compression, encryption, protocol translation and/or address change.

The OCSP responder 688 may identify an OCSP server 668 via any type or form of identifier or address. The identifier or address may be determined via a configuration of the intermediary, application of a policy, and/or application of an algorithm or function. In one embodiment, the OCSP responder 688 may identify an OCSP server 668 via an URL of the OCSP server 668 (i.e., OCSP service, responder or server). For example and in one embodiment, the URL is configured locally in the intermediary 200, and may be retrieved from memory or from storage. In another embodiment, the URL can be extracted or determined from the client certificate 678 (e.g., from the X509v3 Authority Information Access:OCSP-URI extension field, hereafter generally referred to as "AIA"). In still another embodiment, the URL can be extracted or determined from the OCSP request received from the SSL engine 667. In some embodiments, the URL may be generated or identified based on information regarding any one or more of: a certificate, an associated CA, the client, and the SSL connection request.

The OCSP server 668 can be any type or form of server or computing device, incorporating features of any embodiment of the server 106 and/or computing device 100 described above in connection with FIGS. 1A-1F and 2B. The OCSP server 668 may be a HTTP or a HTTPS server. In some embodiments, the OCSP server 668 comprises one or more OCSP responders 688, such as any embodiment of OCSP responders as described above or as described by OCSP standards. The OCSP server 668 may be identified by any identifier or address. In some embodiments, the OCSP server 668 is identified by an OCSP URL 676, described above. The OCSP server 668 may provide one or more services, including an OCSP responder service for determining a status of a certificate. In certain embodiments, the OCSP server 668 is a vserver 275 executing on the intermediary 200 or another network device. The vserver 275 may provide one or more services, including an OCSP responder service. In some embodiments, the OCSP responder service is identified by the OCSP URL 676 as described above.

The OCSP server 668 may include one or more storage devices and/or caches 622 to store, organize or maintain certification revocation status and other OCSP or certificate related information. These information may be maintained in any type or form of data structure, lists, hash structure and/or tables. These information may be compressed and/or encrypted. The OCSP server 668 may include a transceiver to receive communications (e.g., requests 689) and transmit communications (e.g., responses 680). The OCSP responder service of the OCSP server 668 may process a received request, for example extracting certificate from the request, identifying one or more certificates to be validated, retrieving information (e.g., a status) about each certificate (e.g., from storage), determining or evaluating a status of each certificate, validating the status with another OCSP responder 688 and/or a CRL, consolidating one or more statuses into a single status, generating one or more responses to one or more received requests, and combining a plurality of responses into a single response 680.

In some embodiments, the OCSP server 668 generates and transmits a response 680 to the OCSP responder 688. The response 680 can be any type or form of communication using any standard, custom or proprietary communications protocol. In some embodiment, the response 680 is an OCSP response 680. The OCSP response 680 may be HTTP-based or HTTPS-based. For example and in some embodiments, a HTTP-based OCSP response 680 can include appropriate HTTP headers. An OCSP response 680 can include a binary value of the DER encoding of the response 680 to the request 689. The OCSP response 680 may include a Content-Type header that can have a value of "application/ocsp-response". The OCSP response 680 may include a Content-Length header to convey the length of the response 680. In some embodiments, the response 680 is a return code and includes the status of each certificate 678 that was queried. The response 680 may include any type or form of information for determining a status of a certificate. In some embodiments, the response 680 may indicate that the request 689 is unauthorized, malformed or defective. In some embodiments, the response 680 does not provide information regarding a status of a certificate if the request is unauthorized, malformed or defective. In other embodiments, the response 680 may include information regarding the status of a certificate even if the request is unauthorized, malformed or defective. The response 680 may include one or more of, but not limited to: an algorithm for a signature, a timestamp or identifier of the creation of the response 680, certificate information, a version of the OCSP, supported or required OCSP extensions, and an identity of the OCSP server 668 or responder. The response 680 may include a status of a certificate indicating that the certificate is good, revoked, unknown, or otherwise. In some embodiments, the response 680 includes information about the time of revocation or expiration of the certificate.

By way of illustration, FIG. 6C depicts one embodiment of an OCSP response. By way of illustration and not intended to be limiting in any way, one embodiment of a basic response type Protocol Data Unit (PDU) and/or structure for an OCSP response is as follows:

```
OCSPResponse ::= SEQUENCE {
responseStatus OCSPResponseStatus,
responseBytes       EXPLICIT ResponseBytes       may be
                                                 OPTIONAL
}
OCSPResponseStatus ::= ENUMERATED {
   successful          (0),
   malformedRequest    (1),
   internalError       (2),
   tryLater            (3),
--(4) may not be used
   sigRequired         (5),
   unauthorized        (6)
   }
ResponseBytes ::=      SEQUENCE {
      responseType     OBJECT IDENTIFIER,
      response         OCTET STRING }
```

```
For a basic OCSP responder, responseType will be
   id-pkix-ocsp-basic.
      id-pkix-ocsp           OBJECT IDENTIFIER ::= { id-ad-ocsp }
      id-pkix-ocsp-basic     OBJECT IDENTIFIER ::= { id-pkix-ocsp 1 }
BasicOCSPResponse ::= SEQUENCE {
tbsResponseData       ResponseData,
   signatureAlgorithm AlgorithmIdentifier,
   signature          BIT STRING,
   certs              EXPLICIT SEQUENCE OF Certificate
                      may be OPTIONAL
}
ResponseData ::= SEQUENCE {
Version               EXPLICIT Version
                      DEFAULT v1,
   responderID   ResponderID,
   producedAt    GeneralizedTime,
   responses     SEQUENCE OF
                 SingleResponse,
   responseExtensions EXPLICIT Extensions
                      may be OPTIONAL
}
ResponderID ::= CHOICE {
   byName         Name,
   byKey          KeyHash
}
KeyHash ::= OCTET STRING (SHA-1 hash of
           responder's public key)
SingleResponse ::= SEQUENCE {
certID              CertID,
certStatus          CertStatus,
   thisUpdate       GeneralizedTime,
   nextUpdate       EXPLICIT GeneralizedTime      may be
                                                  OPTIONAL,
   singleExtensions EXPLICIT Extensions           may be
                                                  OPTIONAL
}
CertStatus ::= CHOICE {
   good           IMPLICIT NULL,
   revoked        IMPLICIT RevokedInfo,
   unknown        IMPLICIT UnknownInfo }
RevokedInfo ::= SEQUENCE {
revocationTime      GeneralizedTime,
   revocationReason    EXPLICIT CRLReason         may be
                                                  OPTIONAL
}
UnknownInfo ::= NULL
```

In some embodiments, the OCSP response must be signed. In other embodiments, the OCSP response may be optionally signed. In certain embodiments, the intermediary 200 may support the "Authorized Responders" extension. Some embodiments of the "Authorized Responders" extension are described in §4.2.2.2 of [RFC2560]. This extension may provide verification that the signing certificate for the OCSP response has the id-kp-OCSPSigningrole in extendedKey-Usage. This extension may apply where the signer of the request may not be the original issuer of the client certificate 678. Support for the construction and/or parsing of OCSP request and response data structures may be handled or supported by code described by OpenSSL OCSP/ASN.1. In some embodiments, this code may prevent other methods or programs from directly parsing these structures, e.g., for security reasons.

The OCSP responder 688 may receive the response 680 in response to the request 689. In some embodiments, the OCSP responder 688 forwards the response 680 to the SSL engine 667. In other embodiments, the OCSP responder 688 processes the response 680 and sends a second response to the SSL engine 667. In certain embodiments, the response transmitted to the SSL engine 667 may be in the form of an OCSP response. In one embodiment, the OCSP responder 688 may process and consolidate a plurality of responses 680 into a single response for transmission to the SSL engine 667. The certificate statuses corresponding to a plurality of responses 680 may be combined or evaluated into a single status included in the single response. The OCSP responder 688 may consolidate the responses and/or statuses based on one or more of: an algorithm specified in the configuration of the OCSP responder 688 and application of one or more policies. A plurality of OCSP responders 688 may each transmit one or more responses to the SSL engine 667.

The SSL engine 667 may be designed and constructed to process responses from one or more OCSP responders 688. The SSL engine 667 may determine or extract a status of a certificate from one or more of the responses. In some embodiments, the SSL engine 667 may combine or evaluate statuses from a plurality of responses into a single status for a certificate. The SSL engine 667 may combine or evaluate the statuses into the single status based on one or more of: a weight assigned to each OCSP responder 688 of the plurality of OCSP responders, application of a policy to the statuses, a configuration (e.g., of the SSL engine 667), application of a function or algorithm to the statuses, and a priority assigned to the plurality of responses and/or statuses. The SSL engine 667 may determine that a status of the received certificate is one of: good, revoked, unknown or otherwise. In some embodiments, the status may be unknown because an associated request is unauthorized, malformed or defective.

In some embodiments, the SSL engine 667 is designed and constructed to establish SSL connections. The SSL engine 667 may establish an SSL connection in response to a receipt or determination of the status of the client certificate 678. In some embodiments, as described above, the SSL engine 667 establishes an SSL connection while certificate validation is pending. In other embodiments, the SSL engine 667 may suspend establishment of an SSL connection while certificate validation is pending. In certain embodiments, the SSL engine 667 may disestablish the SSL connection if the certificate status is determined to be revoked, unknown and/or expired. The SSL engine 667 may disestablish the SSL connection if the request to the OCSP responder 688 and/or OCSP server 668 is unauthorized. In some embodiments, the SSL engine 667 may establish or maintain an SSL connection if the certificate revocation status is valid (i.e., unexpired) and good (i.e., not revoked). In some embodiments, the SSL engine 667 may not establish or maintain an SSL connection if the certificate revocation status is invalid (i.e., expired or unknown) and/or revoked.

Figure 7A:
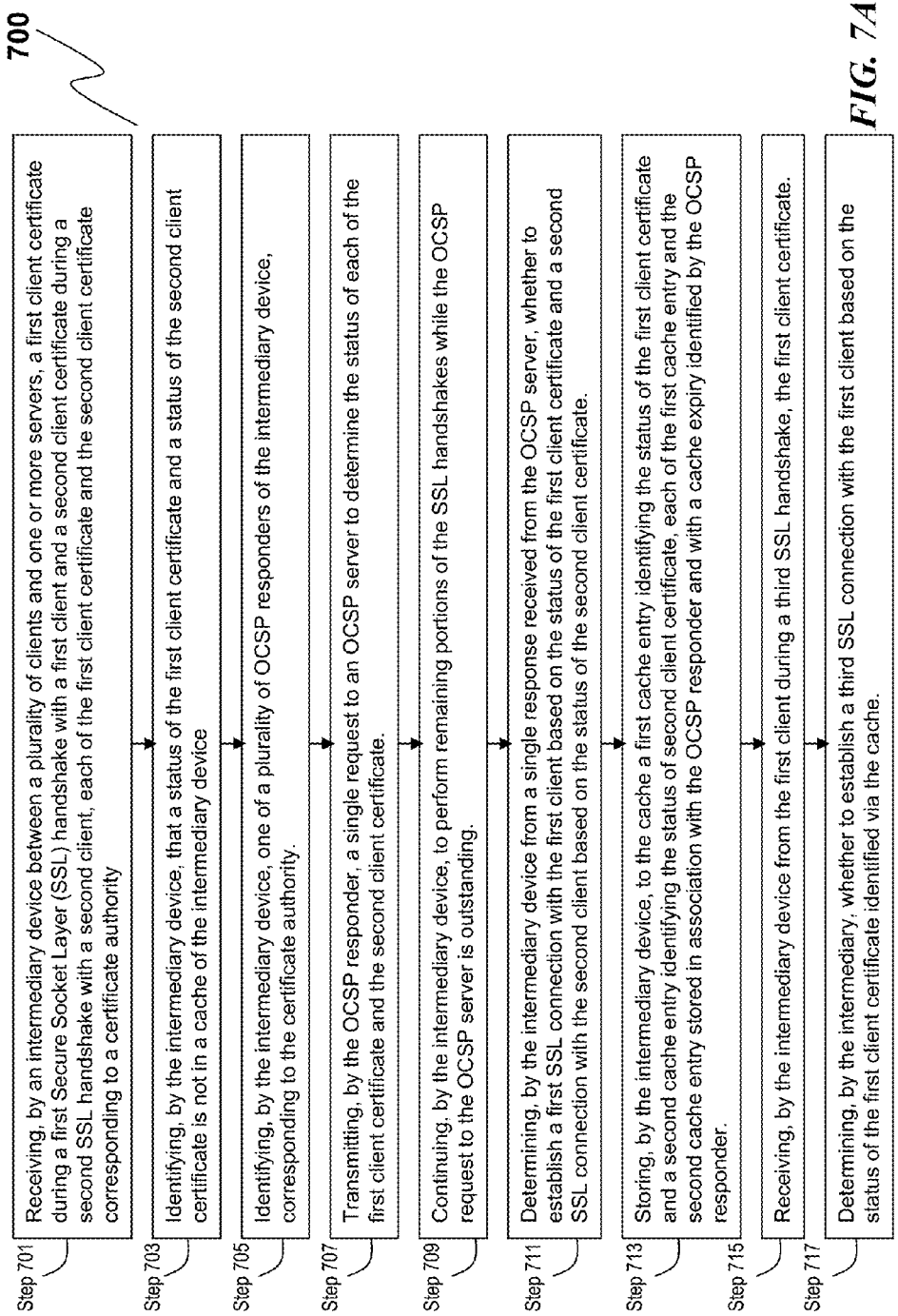
FIG. 7A is a flow diagram of an embodiment of steps of a method for batching and/or caching OCSP responses.

Referring now to FIG. 7A, a flow diagram depicting an embodiment of steps of a method 700 for batching OCSP requests and caching responses to the OCSP requests is shown. In brief overview, at step 701, an intermediary device 200 receives a client certificate 678 (referred to for convenience as a first client certificate) during a first SSL Handshake 677 with a first client and another client certificate 678 (referred to for convenience as a second client certificate) during a second SSL handshake 677 with a second client. Each of the first client certificate 678 and the second client certificate 678 may correspond to a certificate authority. At step 703, the intermediary device 200 identifies that a status of the first client certificate 678 and a status of the second client certificate 678 is not in a cache 622 of the intermediary device 200. At step 705, the intermediary device 200 identifies one of a plurality of OCSP responders of the intermediary device 200 corresponding to the certificate authority. At step 707, the OCSP responder 688 transmits a single request to an OCSP server 668 to determine the status of each of the first client certificate 678 and the second client certificate 678. At step 709, the intermediary device 200 continues to perform remaining portions of the SSL handshakes 677 while the OCSP request to the OCSP server 668 is outstanding. At step 711, the intermediary device 200 determines from a single response 680 received from the OCSP server 668, whether to establish a first SSL connection with the first client based on the status of the first client certificate 678 and a second SSL connection with the second client based on the status of the second client certificate 678. At step 713, the intermediary device 200 stores to the cache 622 a first cache entry identifying the status of the first client certificate 678 and a second cache entry identifying the status of second client certificate 678. Each of the first cache entry and the second cache entry may be stored in association with the OCSP responder 688 and with a cache expiry identified by the OCSP responder 688. At step 715, the intermediary device 200 receives the first client certificate 678 from the first client during a third SSL handshake. At step 717, the intermediary 200 determines whether to establish a third SSL connection with the first client based on the status of the first client certificate 678 identified via the cache 622.

In some embodiments, a client 102 may request access to a resource such as a file or service, or request a connection to a server via the intermediary 200. The request may initiate a connection handshake (e.g., SSL handshake 677) between the client and the intermediary 200. For example, the request may be via HTTPs. As shown in FIG. 7C, one embodiment of a SSL handshake process includes a plurality of steps, including various exchanges between the client and the intermediary. A certificate authority (CA) may issue a client certificate 678 for the client 102 prior to or during the handshake for validating the connection request or process. The intermediary 200 can handle one or more SSL handshakes in connection with one or more client requests.

In further details of step 701, an intermediary device 200 receives a first client certificate 678a during a first SSL handshake 677a with a first client and a second client certificate 678b during a second SSL handshake 677b with a second client. Each of the first client certificate 678a and the second client certificate 678b may correspond to a CA. The SSL engine 667 of the intermediary 200 may determine that the first and second certificates 678 corresponds to a common CA. In some embodiments, each of the first and second client certificates 678 may correspond to a different CA. The intermediary device 200 may receive one or both of the first client certificate 678a or the second client certificate 678b each including an identifier of the corresponding CA. In some embodiments, both the first and second client certificates 678 include an identifier of the same CA.

The intermediary 200 may receive the first client certificate 678a at substantially the same time as the second client certificate 678b. The intermediary 200 may receive the first and second client certificates 678 within a predefined time interval. In some embodiments, the intermediary 200 receiving a first client certificate 678a may wait to receive a predetermined number of other client certificates, such as a second client certificate 678b, for example, that is issued by the same CA. In some embodiments, the intermediary may identify a predetermined number of certificates within a predetermined time period. In some embodiments, the intermediary may identify a predetermined number of certificates within a predetermined time period for one or more CAs. In some embodiments, the intermediary may form a set, group or batch from any of these received certificates, such as those certificates received within a predetermined time period and/or reached a predetermined number of certificates. The intermediary may batch any one or more certificates and/or request for the same based on any criteria, including common CA, temporal information, client information, server information or network information.

In further details of step 703, the intermediary device 200 identifies that a status of a received client certificate or batch of certificates, such as first client certificate and the second client certificate, is not in a cache 622 of the intermediary device. The SSL engine 667 may be in communication with the cache manager 232 to determine or access a status of the client certificate, such as the first and/or second client certificate 678 from the cache 622. The SSL engine 667 may identify the cache manager 232 from a plurality of cache managers in the intermediary 200, e.g., via application of one of a plurality of policies. The cache manager 232 may determine or access a status of the client certificate, such as the first and/or second client certificate 678m on behalf of the SSL engine 667. In some embodiments, the SSL engine 667 communicates information about the client certificate(s) to the cache manager 232 to identify a status of the certificates.

In some embodiments, the SSL engine 667 communicates to the cache manager 232 via an OCSP responder 688. The SSL engine 667 may send a request, such as an OCSP request, to the OCSP responder 688 as described above in connection with FIG. 6A. The OCSP responder 688 may control, direct, request or otherwise communicate with the cache manager 232 to determine a status of the certificate or batch of certificates, such as the first and/or second certificates. The cache manager 232 may identify or indicate to the SSL engine 667 or OCSP responder 688 a cache entry, location or partition of the cache 622 to access a status of the certificate, such as the first and/or second certificate. The cache manager 232 may identify or access a CRL or other data structure having features of a CRL in the cache 622. The cache manager 232 may retrieve or determine a status of the certificate, such as the first and/or second certificate. The cache manager 232 may determine that a status of a certificate is unknown or unavailable (e.g., because the cache 622 is not accessible or a cache entry for storing the status cannot be identified). The cache manager 232 may determine that a status of the certificate is not up-to-date. In some embodiments, "not up-to-date" indicates that the status is unknown or may have changed, e.g., because the status has not been updated within a certain amount of time. The cache manager 232 may determine that a cache entry for the status of the certificate has expired. In some embodiments, expiration may indicate that the certificate has expired and is no longer valid.

In some embodiments, if the cache manager 232 determines that the status of a batch or set of one or more certificates, such as both the first and second certificates, are unknown, unavailable or not up-to-date. In some of these embodiments, the method may proceed to step 705. In another embodiment, if the cache manager 232 determines that both the status of the first and second certificates has expired, the method may proceed to step 705. In still another embodiment, if the cache manager 232 determines that at least one of the status of the first and second certificates is unknown, unavailable or not up-to-date, the method may proceed to step 705. In yet another embodiment, if the cache manager 232 determines that at least one of the status of the first and second certificates has expired, the method may proceed to step 705.

In certain embodiments, if any one of the status is identified as good and has not expired, the SSL engine 667 may complete the SSL handshake 677 of the corresponding certificate. The SSL engine 667 may also proceed to establish a SSL connection corresponding to the good certificate(s). In some embodiments, if any one of the status is identified as revoked, the SSL engine 667 may terminate the corresponding SSL handshake 677. In these embodiments, the SSL engine 667 may deny establishment of a SSL connection corresponding to the revoked certificate(s). In some embodiments, if one of the status is identified as expired, the SSL engine 667 may terminate the corresponding SSL handshake 677. In these embodiments, the SSL engine 667 may deny establishment of a SSL connection corresponding to the expired certificate(s). In certain embodiments, the SSL engine 667 may additionally attempt to access a CRL and/or an OCSP server 668 to validate the status of a certificate.

In further details of step 705, the intermediary device identifies one of a plurality of OCSP responders of the intermediary device corresponding to the certificate authority. The SSL engine 667 may identify an OCSP responder 688 from a plurality of OCSP responders. The SSL engine 667 may identify the OCSP responder 688 from a plurality of OCSP responders based on the certificate authority of one or both certificates received. The SSL engine 667 may identify the OCSP responder 688 responsive to determining that a status of one or both of the client certificates 688 is not in the cache 622. The SSL engine 667 may identify the OCSP responder 688 responsive to determining that a status of one or both of the client certificates is not determinable from the cache 622. The SSL engine 667 may identify the OCSP responder 688 responsive to determining that the cache 622 is not accessible to at least one of: the cache manager 232 and the SSL engine 667.

The intermediary 200, such as via the SSL engine 667, may identify the OCSP responder 688 from a plurality of OCSP responders responsive to determining that the status of a batch of certificates, such as each of the first and second certificates are one of: unknown, not available, or not up-to-date. The SSL engine 667 may identify the OCSP responder 688 by one or more of: application of one of a plurality of policies (e.g., by a policy engine 236), accessing a configuration (e.g., that associates an OCSP responder 688 to a CA of a certificate), executing an algorithm, applying a function on the plurality of OCSP responders.

In some embodiments, the intermediary 200 establishes an OCSP responder 688. The OCSP responder 688 may be established or executed via the SSL engine 667 or packet engine. The intermediary 200 may establish the OCSP responder 688 based on a determination that a received certificate is issued by a new CA or a CA not associated with other OCSP responders of the intermediary 200. The intermediary 200 may establish the OCSP responder 688 responsive to receiving information about or from the CA. The intermediary 200 may establish the OCSP responder 688 responsive to an inability to determine a status of a received certificate from the cache 622. The intermediary 200 may establish a plurality of OCSP responders, e.g., responsive to receiving one or more client certificates and/or information about one or more CAs. Each OCSP responder 688 may be established and/or configured using any embodiment of the commands described above in connection with FIG. 6A. The intermediary 200 may identify a newly established OCSP responder 688 as the OCSP responder 688 for certificate validation. In some embodiments, instead of establishing a new OCSP responder 688, an existing OCSP responder 688 may be reconfigured to perform certificate validation for the received certificate.

In further details of step 707, the OCSP responder 688 transmits a single request to an OCSP server 668 to determine the status of a certificate, such one of the first client certificate and the second client certificate. The OCSP responder 688 may transmit a single request to an OCSP server 668 to determine the status of a batch of certificates, such both of the first client certificate and the second client certificate. The OCSP responder 688 may transmit a request to the OCSP server 668 in association with one or more certificates. The OCSP responder 688 may transmit a request to the OCSP server 668 in connection with one or more certificates issued by the same CA. The OCSP responder 688 may transmit the request to the OCSP server 668 as an OCSP request. The OCSP responder 688 may transmit a request identifying one or more client certificates 688. In some embodiments, the OCSP responder 688 may transmit a request for each client certificate 678. The OCSP responder 688 may transmit a single request for certificates issued by one or more CAs to a single OCSP server 668 assigned to or associated with the one or more CAs. In certain embodiments, the OCSP responder 688 may transmit a request to an OCSP service provided by any one of: a OCSP server 668, the intermediary 200 or any other network device.

The OCSP responder 688 may identify the OCSP server 668 or service by an URL 676. The OCSP responder 688 may identify the OCSP server 668 or service by a host name and/or IP address. The OCSP responder 688 may identify the OCSP server 668 or service by a host name and/or IP address with a port number. The OCSP may identify the OCSP server 668, service and/or URL 676 via one or more of: a configuration of the OCSP responder 688, application of a policy by the policy engine 236, application of a function or an algorithm, and retrieval of the identification via a hash table or other data structure (e.g., from the cache 622). In some embodiments, the OCSP responder 688 transmits a request to a CRL service or accesses a CRL to determine the status of a client certificate 678. In certain embodiments, the OCSP responder 688 performs a combination of any one or more of the following to determine the status of two or more client certificate 678s: accessing the cache 622, accessing a CRL, and sending a request to an OCSP server 668, responder or service.

The OCSP responder 688 may generate a request for one or more certificates. The OCSP responder 688 may consolidate or batch one or more requests corresponding to one or more certificates into a single request. The OCSP responder 688 may transmit the single request as a batch request in connection with one or more certificates. The intermediary device 200 or the OCSP responder 688 may transmit each OCSP request as part of a batch OCSP request to the OCSP server 668 for statuses of a plurality of client certificates. The OCSP responder 688 may consolidate or batch one or more requests corresponding to a common CA. The OCSP responder 688 may consolidate or batch one or more requests for certificates received at substantially the time. The OCSP responder 688 may consolidate or batch one or more requests for certificates received within a predetermined or dynamically determined period of time.

The intermediary device 200 or OCSP responder 688 may wait a predetermined time period for receipt of additional client certificates before transmitting the single request. In some embodiments, the OCSP responder 688 may wait a predetermined time period for receipt of additional client certificates corresponding to the certificate authority before transmitting the single request 689. For example and in one embodiment, the intermediary device 200 receives a third client certificate 678c before expiration of the predetermined time period. The intermediary 200 may include in the single request 689 to the OCSP server 668 a request for the status of the third client certificate 678c. In some embodiments, the OCSP responder 688 may wait for receipt of a plurality of client certificates before transmitting the single request 689. For example and in one embodiment, the OCSP responder 688 may wait for a specific number of certificates before sending the request 689. In another embodiment, the OCSP responder 688 may wait for at least a certain number of certificates to be reached before sending the request 689.

In further details of step 709, the intermediary device continues to perform remaining portions of the SSL handshakes while the OCSP request to the OCSP server 668 is outstanding. In some embodiments, the intermediary 200 may operate in a non-blocking mode. In non-blocking mode, the SSL engine 667 of the intermediary 200 may continue to perform remaining portions of the SSL handshakes while the request to the OCSP server 668 for certificate revocation status is outstanding or pending. The intermediary 200 may continue to perform remaining portions of the SSL handshakes while the certificate revocation status is outstanding or pending. In one embodiment, the SSL engine 667 may establish a SSL connection while the certificate status or the OCSP request (hereafter generally referred to as "OCSP request") is outstanding. In some embodiments, the SSL engine 667 determines whether to terminate or maintain the SSL connection based on the status of the client certificate 678 received via the response. For example and in one embodiment, the SSL engine 667 determines in response to a request from the client via the established SSL connection whether to terminate or maintain the SSL connection based on the status of the client certificate 678 received via the response.

The intermediary 200 may continue to perform a portion of the SSL handshakes while the OCSP request is outstanding or pending. For example and in some embodiments, the intermediary 200 may transmit to the client a secret key encrypted with a public key while the OCSP request or the certificate status is outstanding. The intermediary 200 or the client 102 may generate a random number for a pre-master secret key while the OCSP request to the OCSP server 668 is outstanding. The intermediary 200 or the client 102 may calculate or determine a master secret key while the OCSP request to the OCSP server 668 is outstanding.

In some embodiments, the intermediary 200 may operate in a blocking mode. In blocking mode, the SSL engine 667 of the intermediary 200 may suspend one or more SSL handshake steps while the OCSP request to the OCSP server 668 for certificate revocation status is outstanding or pending. In one embodiment, the SSL engine 667 may complete the SSL handshake 677 but may not establish a SSL connection while the OCSP request to the OCSP server 668 is outstanding. The intermediary 200 may suspend some portions of a first handshake while continuing to perform remaining portions of a second handshake while the OCSP request or the certificate status is outstanding. The intermediary 200 may suspend a portion of the SSL handshakes while the certificate revocation status is outstanding or pending.

In some embodiments, the intermediary 200 establishes an SSL connection responsive to receipt of a status of a corresponding client certificate 678 from the OCSP server 668. The intermediary 200 or SSL engine 667 may establish an SSL connection responsive to receipt of a status that is good (i.e., neither revoked nor expired). The intermediary 200 may determine to terminate an established SSL connection based on the status of a corresponding client certificate 678 corresponding to one of revoked, unknown and/or expired. In some embodiments, the SSL engine 667 may attempt to re-validate the client certificate 678. For example and in one embodiment, the OCSP responder 688 or SSL engine 667 may receive a response indicating that the OCSP request is malformed or defective. In another embodiment, the OCSP responder 688 or SSL engine 667 may determine that the OCSP server 668 or service is not responsive. The OCSP responder 688 may send a second request to at least one of: the same OCSP server 668 or service, a second OCSP server 668 or service, a CRL server, and a cache manager 232.

In further details of step 711, the intermediary 200 device determines from a single response received from the OCSP server 668, whether to establish a first SSL connection with the first client based on the status of the first client certificate 678 and a second SSL connection with the second client based on the status of the second client certificate 678*b*. In certain embodiments, step 711 operates in accordance with some embodiments of the blocking mode described above. In certain embodiments, the OCSP responder 688 receives the response as an OCSP response. The OCSP responder 688 may receive a single response 680 responsive to the single request 689. The OCSP responder 688 may receive a plurality of responses 680*a-n* responsive to the single request 689. The OCSP responder 688 may receive a plurality of responses responsive to a plurality of requests transmitted. In some embodiment, the OCSP responder 688 receives a single response 680 that includes the status of one or more certificates (e.g., the first and the second certificates). The OCSP responder 688 may receive a single response 680 that includes the status of one or more certificates issued by the same CA. The one or more responses may be generated and/or transmitted by one or more of: an OCSP server 668, responder or service, a CRL server, and a cache manager 232.

In some embodiments, the OCSP responder 688 may receive a response 680 indicating that the request is malformed or defective. The OCSP responder 688 may receive a response 680 requesting for one or more of: more information about the client certificates, a resend of the one or more requests, a resend of a portion of the requests (e.g., batched into a second single response 689 or individually), and a resent of a request in a specific format (e.g., in OCSP format).

The OCSP responder 688 may parse, extract, evaluate, determine or otherwise process the one or more received responses 680 for certification revocation status and/or other information. The OCSP responder 688 may receive a response 680 including statuses of at least a portion of the certificates. The OCSP responder 688 may receive a response 680 including an indication that a status of at least one of the certificates is good, revoked, unknown, unidentified, expired, out-of-date, and/or unavailable. The SSL engine 667 may end the suspension of SSL handshakes for corresponding client certificates that have a good and unexpired status. The SSL engine 667 may continue with remaining portions of SSL handshakes 677 for corresponding client certificates having a good status. In some embodiments, the SSL engine 667 may establish SSL connections with those clients having client certificates with a good and unexpired status. The SSL engine 667 may not establish SSL connections with those clients having client certificates not having a good status. In some embodiments, such as in non-blocking mode, the SSL engine 667 may determine to maintain established SSL connections for corresponding client certificates determined to have a good and unexpired status.

If a status of any of the certificates is determined to be one or more of: revoked, unknown, unidentified, expired, out-of-date, and/or unavailable, the SSL engine 667 may do one or more of: suspend the corresponding SSL handshake 677 (e.g., at the time of the determination and/or request the status from another entity), continue the SSL handshake 677 (e.g., while requesting the status from another entity), terminate the corresponding SSL handshake 677, determine not to establish a SSL connection corresponding to the certificate, and determine to disestablish or not to maintain an established SSL connection corresponding to the certificate. If any of the SSL connections is denied or disestablished, the intermediary 200 may indicate to the client a rejection of the client request for the connection and/or request for a new certificate.

In some embodiments, the intermediary 200 may identify an SSL connection or session previously established for the first client. Based on the status (e.g., good and not expired) of the first certificate, the intermediary 200 may update, re-establish, re-use or resume the identified SSL connection or session for the first client. For example and in one embodiment, the intermediary 200 may update, re-establish, re-use or resume the identified SSL connection or session for the first client via the third SSL handshake 677.

In further details of step 713, the intermediary device stores to the cache 622 a first cache entry identifying the status of the first client certificate 678a and a second cache entry identifying the status of second client certificate 678b. Each of the first cache entry and the second cache entry may be stored in association with the OCSP responder 688 and with a cache expiry identified by the OCSP responder 688. The intermediary 200 may store, via one or more of the OCSP responder 688 and the cache manager 232, a received or determined certificate status. The cache manager 232 may receive the status from the OCSP responder 688. The cache manager 232 may store the status in the cache 622 for local retrieval. The cache manager 232 may store or organize the status in the cache 622 for quick retrieval. The cache manager 232 may identify, locate or create a cache entry to store the status. The cache manager 232 may use a hash (such as a fast hash, e.g., ns_hashmd5 function) to calculate a hash key for storing the status. The cache manager 232 may use the first and last 32 bits of the issuer and subject to calculate the hash key.

The status may be stored if the status is valid (e.g., not expired nor unknown). In some embodiments, the cache manager 232 may indicate in the cache entry that a status is unknown and/or expired. In certain embodiments, the cache manager 232 may store any type or form of information to a cache entry corresponding to a client certificate 678. For example and in one embodiment, the cache manager 232 may store an identifier (e.g., URL) of an entity (e.g., OCSP server 668, CRL) providing the certificate status, and/or an expiry time for the stored information.

The cache manager 232 may store the status in a CRL, hash table or other data structure in the cache 622. The intermediary device may generate (e.g., via the cache manager 232) a hash or other data structure for each cache entry storing a status. The cache manager 232 may generate a hash or other data structure for one of a first cache entry corresponding to the first certificate or a second cache entry corresponding to the second certificate. The cache manager 232 may generate each hash or other data structure based on one or more of: a certificate, a certificate status, an issuer name, a subject name, the entity providing the status, the corresponding client and the response 680. The cache manager 232 may store the one of the first cache entry or the second cache entry of responses to the OCSP responder 688 separate from cache entries of responses to a second OCSP responder 688. In some embodiments, the cache manager 232 may partition the cache according to one or more of: a plurality of OCSP responders, a plurality of OCSP servers 668 or services, and a plurality of CAs.

In further details of step 715, the intermediary device receives the first client certificate from the first client during a third SSL handshake. The intermediary 200 may receive a client certificate 678 from any client for which certificate status is pending, determined or unknown (e.g., no prior certificate validation performed for the particular client certificate 678). The intermediary 200 and its components may perform any embodiments of the steps 701 and/or 703 described above in connection with the receipt. The cache manager 232 may access a status of the client certificate 678 from the cache 622, if available. The SSL engine 667 may suspend the third SSL handshake while determining the status from the cache 622. The SSL engine 667 may continue with at least a portion of the third SSL handshake while determining the status from the cache 622. In some embodiments, the SSL engine 667 may continue with at least a portion of the third SSL handshake if it is determined that the status of the client certificate 678 is pending or outstanding (e.g., the first client certificate 678 from the first SSL handshake is still undergoing validation).

In further details of step 717, the intermediary 200 determines whether to establish a another or requested SSL connection, such as a third SSL connection with the first client based on the status of the first client certificate 678a identified via the cache 622. The intermediary 200 may determine whether to establish or maintain an established SSL connection based on the SSL handshake in accordance with any embodiments of step 711 described above. In one embodiment, for example while in non-blocking mode, the SSL engine 667 may establish the SSL connection if it is determined that the status of the client certificate 678 is pending or outstanding (e.g., the first client certificate from the first SSL handshake is still undergoing validation). The SSL engine 667 may determine to establish the SSL connection based on the first cache entry identifying the status of the first client certificate as good and the first cache entry has not expired. In some embodiments, the intermediary 200 may determine that the status of the first client certificate 678a is one or more of: revoked, expired, unexpired, unknown, not up-to-date, and unavailable. In some of these embodiments, the intermediary 200 may determine not to establish or maintain an established SSL connection based on the SSL handshake.

The SSL engine 667 may determine whether to establish a SSL connection with the first client based on the first cache entry identifying the status of the first client certificate 678a as good and the first cache entry as expired. The SSL engine 667 may determine whether to establish the SSL connection with the first client based on the first cache entry identifying the status of the first client certificate as unknown, unavailable or not up-to-date. In some of these embodiments, the intermediary 200 may request for an updated status via any embodiments of the one or more steps 705-713 described above. In one embodiment, the SSL engine 667 may establish the SSL connection while the updated status is pending. Based on the updated status, the SSL engine 667 may establish or maintain establishment of the SSL connection.

In some embodiments, the intermediary 200 may identify an SSL connection or session previously established for the first client as described above in connection with step 711. Based on the status (e.g., good and not expired) of the first certificate, the intermediary 200 may update, re-establish, re-use or resume the identified SSL connection or session for the first client.

Figure 7B:
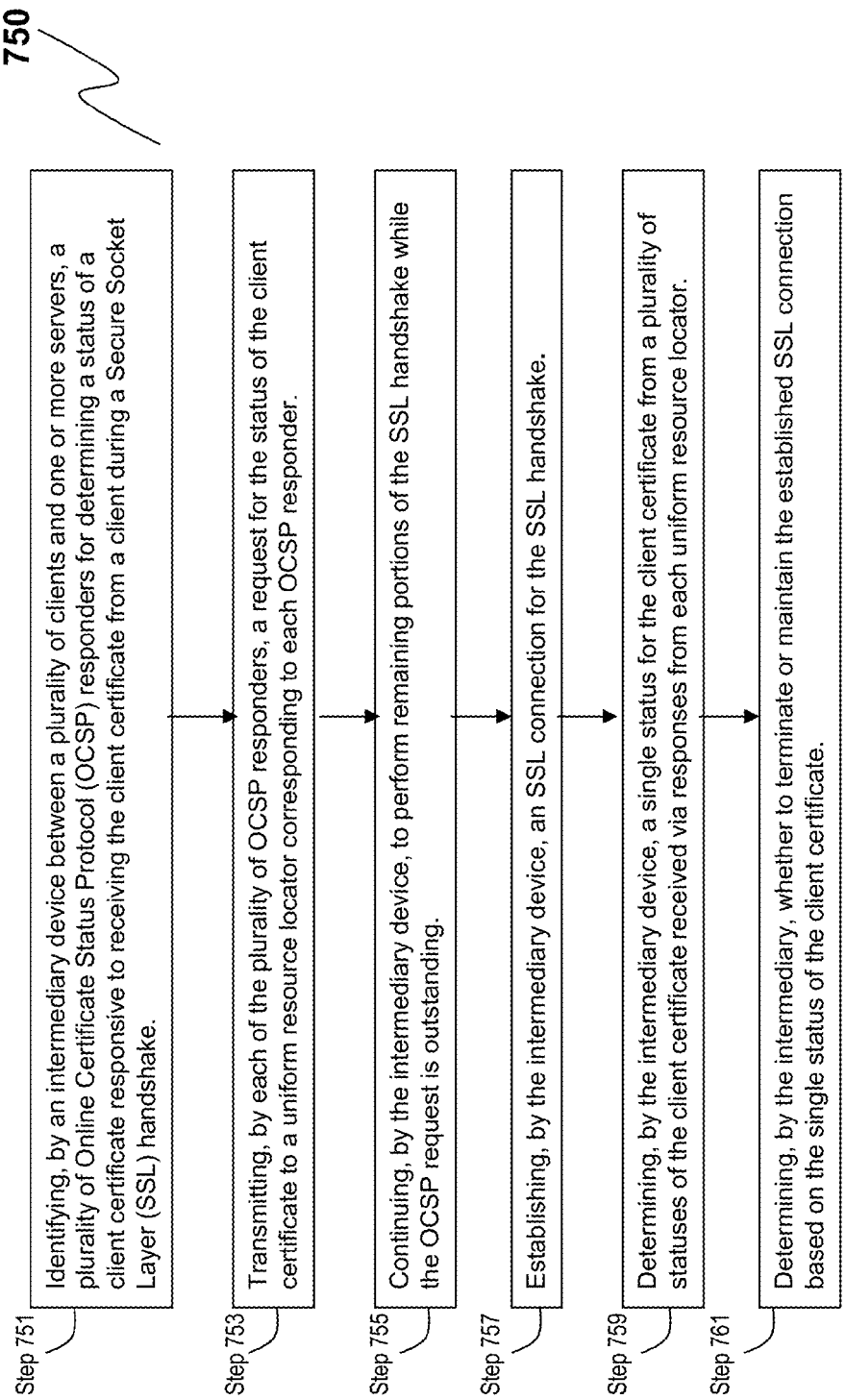
FIG. 7B is a flow diagram of an embodiment of steps of a method for processing an OCSP request in parallel to processing a SSL handshake.
Figure 7C:
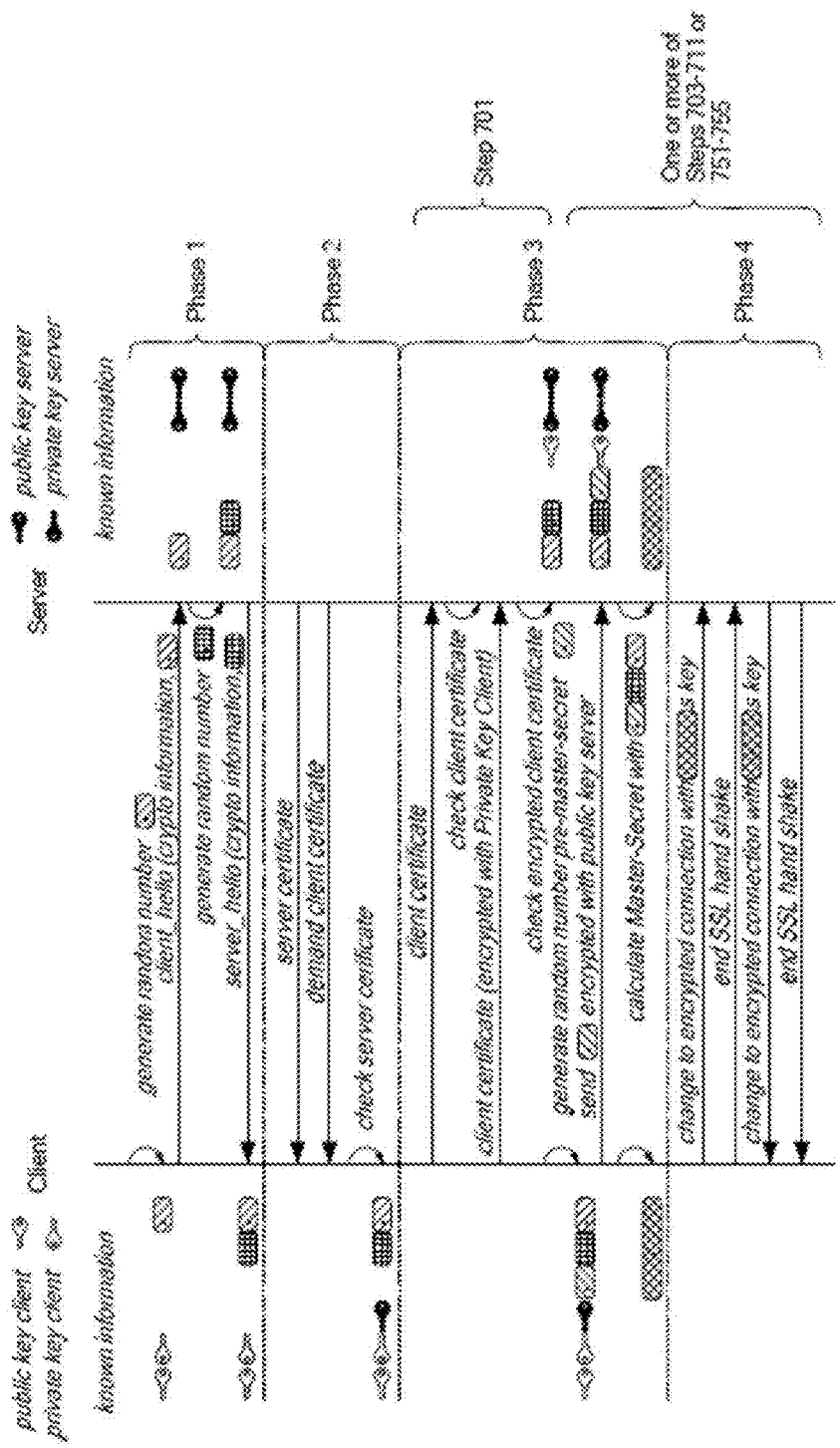
FIG. 7C is a flow diagram of an embodiment of steps of a method for supporting OCSP in connection with an SSL handshaking procedure.

Referring now to FIG. 7B, a flow diagram depicting an embodiment of steps of a method 700 for determining a status of a client certificate 678 from a plurality of responses for an OCSP request is shown. In brief overview, at step 751, an intermediary device identifies a plurality of OCSP responders for determining a status of a client certificate 678 responsive to receiving the client certificate 678 from a client during a SSL handshake 677. At step 753, each of the plurality of OCSP responders transmits a request for the status of the client certificate 678 to a uniform resource locator corresponding to each OCSP responder 688. At step 755, the intermediary device continues to perform remaining portions of the SSL handshake 677 while the OCSP request is outstanding. At step 757, intermediary device establishes an SSL connection for the SSL handshake 677. At step 759, the intermediary device determines a single status for the client certificate 678 from a plurality of statuses of the client certificate 678 received via responses from each uniform resource locator. At step 761, the intermediary determines whether to terminate or maintain the established SSL connection based on the single status of the client certificate 678.

In further details of step 751, an intermediary device identifies a plurality of OCSP responders for determining a status of a client certificate 678 responsive to receiving the client certificate 678 from a client during a SSL handshake 677. The intermediary 200 may identify one or more OCSP responders as described above in connection with any embodiment of step 703. The intermediary 200 may identify the plurality of OCSP responders for system redundancy. In some embodiments, the intermediary 200 may establish a plurality of OCSP responders responsive to receiving the client certificate 678 from a client during a SSL handshake 677. The intermediary 200 may identify the plurality of OCSP responders based on the status of the OCSP responders (e.g., idle, available, waiting for requests, etc). In some embodiments, the intermediary 200 may identify a single OCSP responder 688 responsive to receiving the client certificate 678 from a client during a SSL handshake 677.

The intermediary 200 may identify the plurality of OCSP responders based on one or more of: a configuration (e.g., of the SSL engine 667, of each of the responders), application of a policy by the policy engine 236, application of a function or algorithm, a flow distributer, and a load balancing service. For example and in one embodiment, the intermediary 200 may identify the plurality of OCSP responders based on a certificate authority of the client certificate 678. The intermediary 200 may identify the plurality of OCSP responders based on one or more of: a supported version of OCSP, an identified OCSP server 668 or service (e.g., associated with an OCSP responder 688), the AIA (e.g., indicating CA information associated with the OCSP responders 688), client information, and a priority of the request. For example, the higher the priority, more OCSP responders may be identified. The intermediary 200 may identify each OCSP responder 688 by an identifier or an uniform resource locator, for example retrieved from a configuration parameter for each OCSP responder 688. The one or more OCSP responders may be identified responsive to any embodiments of step 703 described above.

In further details of step 753, each of the plurality of OCSP responders transmits a request for the status of the client certificate 678 to a uniform resource locator 676 corresponding to each OCSP responder 688. Any of the OCSP responders 688 may generate and/or transmit a request 689 as described above in connection with any embodiment of step 707. The OCSP responders may identify the uniform resource locator (URL) 676 corresponding to each OCSP server 668 or service via a configuration parameter for each OCSP responder 688. Each OCSP responder 688 may transmit an OCSP request as part of a batch OCSP request to the OCSP server 668 for statuses of a plurality of client certificates. In some embodiments, all requests are transmitted to a single entity, e.g., an OCSP server 668, OCSP service, OCSP responder 688 or a CRL server. The requests may be transmitted to the entity using the identified URL 676. In other embodiments, each of the request may be transmitted to one of a plurality of entities including one or more of: an OCSP server 668, OCSP service, OCSP responder 688 or a CRL server, e.g., via the corresponding URL.

The intermediary 200 may identify a priority assigned to each OCSP responder 688 of the plurality of OCSP responders. The SSL engine 667 may transmit a request to each OCSP responder 688 based at least in part on the assigned priority. In some embodiments, the intermediary 200 may identify an order of each OCSP responder 688 in the plurality of OCSP responders. The SSL engine 667 may transmit a request to each OCSP responder 688 based at least in part on the identified order. In some embodiments, the intermediary 200 may identify a weight assigned to each OCSP responder 688 of the plurality of OCSP responders. The SSL engine 667 may transmit a request to each OCSP responder 688 based at least in part on the assigned weight. The intermediary 200 may identify any of the priority, order and/or weight based on application of one or more of a plurality of policies by the policy engine 236. The intermediary 200 may identify any of the priority, order and/or weight based on a configuration of the intermediary 200, application of a function or algorithm, a flow distributor, and/or a load balancing service.

In further details of step 755, the intermediary device continues to perform remaining portions of the SSL handshake 677 while the OCSP request is outstanding. For each SSL handshake 677, the intermediary device may continue to perform remaining portions of the SSL handshake 677 while the corresponding certificate status or OCSP request is outstanding or pending. For each SSL handshake 677, the intermediary device 200 may continue to perform some portion of the SSL handshake 677 while the corresponding certificate status or OCSP request is outstanding or pending. The intermediary 200 may handle the SSL handshake 677 as described above in connection with any embodiment of step 709. For example and in one embodiment, the intermediary 200 may handle some or all SSL handshakes in blocking mode. In another embodiment, the intermediary 200 may handle some or all SSL handshakes in non-blocking mode.

In further details of step 757, the intermediary device establishes an SSL connection for the SSL handshake 677. For each SSL handshake 677, the intermediary 200 may determine whether to establish a corresponding SSL connection while the corresponding certificate status or OCSP request is pending or outstanding. For each SSL handshake 677, the intermediary 200 may determine whether to establish a corresponding SSL connection as described above in connection with any embodiment of steps 711 and/or 717. For example and in one embodiment, the intermediary 200 may handle establishment of some or all SSL connections in blocking mode. In another embodiment, the intermediary 200 may handle establishment of some or all SSL connections in non-blocking mode.

In some embodiments, each of the OCSP responders may receive a response 680 to a request 689 for the status of the client certificate 678. The intermediary 200 may determine one or more statuses of the client certificate 678 as described above in connection with any embodiment of step 711. Each of the plurality of responses may be received from one of the plurality of entities. In some embodiments, the plurality of responses are received from a single entity, e.g., OCSP server 668. The plurality of requests may indicate one of a plurality of statuses for the client certificate 678. For example, the status may be identified as good, revoked, expired or out-of-date depending on when and/or which entity processed the response. In some embodiments, the validity, accuracy or probability of correctness of a returned status may depend on one or more of: the weight, order and priority of the OCSP responders.

In further details of step 759, the intermediary device determines a single status for the client certificate 678 from a plurality of statuses of the client certificate 678 received via responses from each uniform resource locator. A packet engine or SSL engine 667 of the intermediary 200 may determine a single status for the client certificate 678 from the plurality of statuses or responses. The intermediary 200 may determine the single status of the client certificate 678 by applying a policy to the plurality of statuses. The intermediary 200 may determine the single status of the client certificate 678 by using a status from the plurality of statuses that first identifies one of a good or revoked status. The intermediary 200 may determine the single status of the client certificate 678 by identifying a status from the plurality of statuses with one of a highest priority or one of a highest weight. The intermediary 200 may determine the single status of the client certificate 678 by applying a function or algorithm to the plurality of statuses. For example, the intermediary may take an average of the responses or weighted average of the responses. The intermediary may identify the response time with the highest count.

The intermediary 200 may determine the single status by considering responses that are received within a certain period of time. The intermediary 200 may determine the single status by eliminating certain responses, such as responses indicating that the status is unknown, not up-to-date or unavailable. The intermediary 200 may determine the single status by selecting a status from a statistical distribution and/or function of the returned statuses. The intermediary 200 may determine the single status by accepting the first returned status that is not expired. In some embodiments, the intermediary 200 may determine the single status by validating the responses against information stored in the cache 622 and/or a CRL. In certain embodiments, the intermediary 200 may store the single status in the cache 622 as described above in connection with any embodiment of step 713.

In some embodiments, such as in blocking mode, the intermediary 200 determines whether to establish the SSL connection responsive to determining the single status. The SSL engine 667 may determine whether to establish the SSL connection as described above in connection with any embodiment of step 711.

In further details of step 761 and in some embodiments, the intermediary 200 determines whether to terminate or maintain the established SSL connection based on the single status of the client certificate 678. The intermediary 200 may be operating in non-blocking mode. The intermediary 200 may determine whether to terminate or maintain the established SSL connection as described above in connection with any embodiment of steps 711 and/or 717. For example and in one embodiment, the intermediary 200 may determine to terminate the established SSL connection based on the status of the client certificate 678 corresponding to one of revoked or unknown. In another embodiment, the intermediary 200 may determine to maintain the established SSL connection based on the client certificate 678 having a good status that is not expired.

In some embodiments, the intermediary 200 may determine whether to terminate or maintain the established SSL connection based on one or more statuses received via the plurality of responses. In some embodiments, the intermediary 200 may identify an SSL connection or session previously established for the first client as described above in connection with step 711. Based on the status (e.g., good and not expired) of the first certificate, the intermediary 200 may update, re-establish, re-use or resume the identified SSL connection or session for the first client.

Referring again to FIG. 7C, one or more steps of the methods described above may operate in conjunction with the depicted SSL handshake 677. An SSL handshake 677 may be initialized by a client hello message generated and transmitted by the client 102. The intermediary 200, operating as a receiving end, may respond with a server-hello message. In addition, the intermediary 200 may request or demand for a client certificate 678 of the client. The client may validate a certificate of the intermediary 200 before transmitting the client certificate 678 to the intermediary 200. Upon receiving the client certificate 678, the intermediary 200 may check the client certificate 678, such as in accordance with step 701 described above. Furthermore, one or more of steps 703-711 or 751-755 may apply, as indicated in FIG. 7C, concurrent with SSL handshake or while the SSL handshake is suspended. In some embodiments, the SSL handshake 677 operates in non-blocking mode. In other embodiments, the SSL handshake 677 operates in blocking mode.

Although some of the steps described above may be identified as performed by the intermediary 200 or by some component or module of the intermediary 200, it should be understood that any other component or module may perform the same or substantially the same steps in various embodiments without departing from the spirit and scope of the invention.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims.

What is claimed is:

1. A method comprising:
   (a) receiving, by a device intermediary between a plurality of clients and one or more servers, while waiting a predetermined time period, a plurality of client certificates of the plurality of clients for a plurality of Secure Socket Layer (SSL) handshakes, each of the plurality of SSL handshakes between the device and a corresponding client of the plurality of clients, the plurality of clients communicating with the one or more servers via the device;
   (b) determining, by the device, that the received plurality of client certificates corresponds to a single certificate authority;
   (c) transmitting, by the device responsive to expiration of the predetermined time period and to the determination that the received plurality of client certificates corresponds to the single certificate authority, and while portions of each of the plurality of SSL handshakes are outstanding, a single request for the plurality of SSL handshakes to an Online Certificate Status Protocol (OCSP) responder to determine the status of each of the plurality of client certificates;

(d) identifying, by the device, the status of each of the plurality of client certificates from a response received from the OCSP responder; and (e) determining, by the device responsive to the status, whether to establish a SSL connection for each of the SSL handshakes of the plurality of SSL handshakes.

2. The method of claim 1, wherein step (a) further comprises receiving, by the device, during the predetermined time period an additional client certificate corresponding to the certificate authority.

3. The method of claim 2, wherein step (c) further comprises including, by the device, in the request to the OCSP responder, a status request for the additional client certificate.

4. The method of claim 1, wherein step (c) further comprises identifying, by the device, that the status of each of the plurality of client certificates is not stored in a cache.

5. The method of claim 1, wherein step (d) further comprises receiving, by the device, the response from the OCSP responder, while portions of the plurality of SSL handshakes are outstanding.

6. The method of claim 1, wherein step (e) further comprises determining, by the device, whether to establish the SSL connection while portions of the plurality of SSL handshakes are outstanding.

7. The method of claim 1, wherein step (e) further comprises determining, by the device, whether to establish the SSL connection for each of the SSL handshakes after one or more of the plurality of SSL handshakes are complete.

8. The method of claim 7, further comprising determining, by the device, whether to maintain a first SSL connection established for a first SSL handshake of the plurality of SSL handshakes.

9. The method of claim 8, further comprising disestablishing, by the device, the first SSL connection based on the client certificate for the first SSL connection not having a good status.

10. The method of claim 1, wherein step (e) further comprises establishing, by the device, the SSL connection for those one or more SSL handshakes having a client certificate with a good status and not establishing, by the device, the SSL connection with those one or more SSL handshakes having a client certificate not having a good status.

11. A system comprising:
a device intermediary between a plurality of clients and one or more servers, the plurality of clients communicating with the one or more servers via the device;
an SSL engine of the device configured to receive, while waiting a predetermined time period, a plurality of client certificates of the plurality of clients for a plurality of Secure Socket Layer (SSL) handshakes, each of the plurality of SSL handshakes between the device and a corresponding client of the plurality of clients;
wherein the device is configured to determine that the received plurality of client certificates corresponds to a single certificate authority;

wherein the device, responsive to expiration of the predetermined time period and to the determination that the received plurality of client certificates corresponds to the single certificate authority, and while portions of each of the plurality of SSL handshakes are outstanding, is configured to transmit a single request for the plurality of SSL handshakes to an Online Certificate Status Protocol (OCSP) responder to determine the status of each of the plurality of client certificates and identify the status of each of the plurality of client certificates from a response received from the OCSP responder; and wherein the device, responsive to the status, is configured to determine whether to establish a SSL connection for each of the SSL handshakes of the plurality of SSL handshakes.

12. The system of claim 11, wherein the SSL engine is further configured to receive, during the predetermined time period, an additional client certificate corresponding to the certificate authority.

13. The system of claim 12, wherein the SSL engine is further configured to include in the request to the OCSP responder a status request for the additional client certificate.

14. The system of claim 11, wherein the SSL engine is further configured to identify that the status of each of the plurality of client certificates is not stored in a cache.

15. The system of claim 11, wherein the SSL engine is further configured to receive the response from the OCSP responder while portions of the plurality of SSL handshakes are outstanding.

16. The system of claim 11, wherein the SSL engine is further configured to determine whether to establish the SSL connection while portions of the plurality of SSL handshakes are outstanding.

17. The system of claim 11, wherein the SSL engine is further configured to determine whether to establish the SSL connection for each of the SSL handshakes after one or more of the plurality of SSL handshakes are complete.

18. The system of claim 17, wherein the SSL engine is further configured to determine whether to maintain a first SSL connection established for a first SSL handshake of the plurality of SSL handshakes.

19. The system of claim 18, wherein the SSL engine is further configured to disestablish the device the first SSL connection based on the client certificate for the first SSL connection not having a good status.

20. The system of claim 11, wherein the SSL engine is further configured to establish the SSL connection for those one or more SSL handshakes having a client certificate with a good status and not establish the SSL connection with those one or more SSL handshakes having a client certificate not having a good status.

* * * * *